(12) United States Patent
Kanza et al.

(10) Patent No.: US 12,713,083 B2
(45) Date of Patent: Aug. 18, 2026

(54) LOCATION-BASED, GENERATIVE ARTIFICIAL INTELLIGENCE

(71) Applicant: AT&T Intellectual Property I, L.P., Atlanta, GA (US)

(72) Inventors: Yaron Kanza, Fair Lawn, NJ (US); Divesh Srivastava, Summit, NJ (US); Balachander Krishnamurthy, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/929,220

(22) Filed: Oct. 28, 2024

(65) Prior Publication Data

US 2026/0122299 A1 Apr. 30, 2026

(51) Int. Cl.
*H04N 21/258* (2011.01)
*H04N 21/8358* (2011.01)

(52) U.S. Cl.
CPC ... *H04N 21/25841* (2013.01); *H04N 21/8358* (2013.01)

(58) Field of Classification Search
CPC .................... H04N 21/25841; H04N 21/8358
USPC ........................................................ 725/34
See application file for complete search history.

(56) References Cited

U.S. PATENT DOCUMENTS 10,248,663 B1 4/2019 Keisler et al.
10,728,197 B2 * 7/2020 Weil ........................ H04L 51/10
11,379,521 B1 * 7/2022 Garthwaite .......... H04N 21/252
11,429,812 B2 * 8/2022 Nataraj .................... G06N 3/09
2008/0195546 A1 * 8/2008 Lilley ................ G06Q 30/0256 705/14.54
2020/0004759 A1 * 1/2020 Brebner .................... G06F 8/10
2020/0012765 A1 * 1/2020 Smaiely ................ H04L 9/3297
2020/0285464 A1 * 9/2020 Brebner ................ G06N 20/00
2021/0271823 A1 9/2021 De Ridder
2023/0084202 A1 * 3/2023 Patil ...................... G16H 30/20 726/26
2023/0208869 A1 6/2023 Bisht et al.
2023/0342392 A1 10/2023 McCarson
2023/0421732 A1 12/2023 Tal et al.
2024/0273793 A1 * 8/2024 DeCharms ............ G06F 40/197
2024/0280373 A1 * 8/2024 Isgar .................. G06Q 30/0269
2024/0320476 A1 * 9/2024 Chandrasekaran .... G06N 20/00

(Continued)

OTHER PUBLICATIONS

Abadi , et al., "Deep Learning with Differential Privacy", arXiv:1607.00133v2 [stat.ML] Oct. 24, 2016 http://dx.doi.org/10.1145/2976749.2978318, Oct. 25, 2016, 14.

(Continued)

*Primary Examiner* — Sahar Aqil Riaz
(74) *Attorney, Agent, or Firm* — Guntin & Gust, PLC; Louis Yang

(57) ABSTRACT

Aspects of the subject disclosure may include, for example, identifying a location associated with digital content, augmenting the digital content according to the location to obtain augmented digital content, and configuring a generative artificial intelligence (AI) model according to the augmented digital content to obtain a location-aware, generative AI model. The location-aware, generative AI model is configured to generate a solution according to the augmented digital content. Other embodiments are disclosed.

20 Claims, 11 Drawing Sheets

(56) References Cited

U.S. PATENT DOCUMENTS

2025/0258685 A1 * 8/2025 Crabtree ................. A63F 13/40

OTHER PUBLICATIONS

Aly , et al., "To Buy or Not to Buy: Computing Value of Spatiotemporal Information", https://dl.acm.org/doi/10.1145/3320431, Sep. 1, 2019, 25.
Bourtoule , et al., "Machine Unlearning", arXiv:1912.03817v3 [cs.CR] Dec. 15, 2020, Dec. 15, 2020, 19.
Cao , et al., "Towards Making Systems Forget with Machine Unlearning", © 2015, Yinzhi Cao. Under license to IEEE. DOI 10.1109/SP.2015.35, 2015, 18.
Cheng , et al., "Leveraging the Context through Multi-Round Interactions for Jailbreaking Attacks", arXiv:2402.09177v1 [cs.LG] Feb. 14, 2024, Feb. 14, 2024, 29.
Cox , et al., "Digital watermarking and steganography", chrome-extension://efaidnbmnnnibpcajpcglclefindmkaj/https://papersim.com/wp-content/uploads/Ref.pdf, 2007, 587.
Dasu , et al., "Geotagging IP Packets for Location-Aware Software-Defined Networking in the Presence of Virtual Network Functions", https://cccblog.org/wp-content/uploads/2017/12/ACM_SIGSPATIAL_2017_paper_44.pdf, 2016, 4.
Eldan , et al., "Who's Harry Potter? Approximate Unlearning in LLMs", http://arxiv.org/abs/2310.02238v2, Oct. 4, 2023, 21 pgs.
Fernandez , et al., "The Stable Signature: RootingWatermarks in Latent Diffusion Models", arXiv:2303.15435v2 [cs.CV] Jul. 26, 2023, Jul. 26, 2023, 21 pgs.
Fischer , et al., "Generative AI Considered Harmful", https://dl.acm.org/doi/10.1145/3571884.3603756, Jul. 19, 2023, 5 pgs.
Flatow, et al., "On the Accuracy of Hyper-local Geotagging of Social Media Content", arXiv:1409.1461v2 [cs.IR] Feb. 1, 2015, Feb. 1, 2015, 10 pgs.
Hwang , et al., "A Brief Survey of Watermarks in Generative AI", 979-8-3503-1327-7/23/$31.00 © 2023 IEEE DOI:10.1109/ICTC58733.2023.10392465, Oct. 11, 2023, 4 pgs.
Jabotinsky , et al., "Can Chatgpt and the Like Be Your Coauthors?", https://www.researchgate.net/publication/373119005_Can_ChatGPT_and_the_Like_Be_Your_Co-Authors_Cardozo_Arts_Entertainment_Law_Journal_Forthcoming, Aug. 2023, 43 pgs.
Ji , et al., "Differential Privacy and Machine Learning: a Survey and Review", http://arxiv.org/abs/1412.7584v1, Dec. 25, 2014, 30 pgs.
Kanza , et al., "A Geospatial Perspective on Data Ownership, the Right to be Forgotten, Copyrights, and Plagiarism in Generative AI", SIGSPATIAL'24, Atlanta, GA, USA 2024. 123-4567-24-567/08/06 . . . $15.00 DOI: 10.475/123 4, Oct. 29, 2024, 4 pgs.
Kanza , et al., "An Online Marketplace for Geosocial Data", Sigspatial '15, Nov. 3-6, 2015, Bellevue, WA, USA ACM 978-1-4503-3967-04/15/11 . . . $15.00. DOI: http://dx.doi.org/10.1145/2820783.2820881., Nov. 3, 2015, 5 pgs.
Kanza, et al., "Location Corroborations by Mobile Devices Without Traces", Oct. 2016DOI: 10.1145/2996913.2997010, Oct. 2016, 5 pgs.
Kra-Oz, Tal , "Geoblocking and the Legality of Circumvention", Jan. 2014DOI: 10.2139/ssrn.2548026ISBN: 1556-5068, Jan. 2014, 46 pgs.
Luo , et al., "Geotagging in Multimedia and Computer Vision A Survey", Kodak Research Laboratories, Eastman Kodak Company https://dl.acm.org/doi/10.1007/s11042-010-0623-y, Jan. 1, 2011, 19 pgs.
Pawelczyk , et al., "In-Context Unlearning: Language Models as Few-Shot Unlearners", arXiv:2310.07579v4 [cs. LG] Jun. 6, 2024, Jun. 6, 2024, 17 pgs.
Samuelson , "Generative AI meets copyright", https://www.science.org/doi/10.1126/science.adi0656 Jul. 14, 2023 • vol. 381 Issue 6654 | A Machine-Intelligent World, Jul. 14, 2023, 5 pgs.
Tarun , et al., "Fast Yet Effective Machine Unlearning", arXiv:2111.08947v5 [cs.LG] May 31, 2023, May 31, 2023, 13 pgs.
Teitler , et al., "NewsStand: A New View on News", ACM GIS '08, Nov. 5-7, 2008. Irvine, CA, USA 2008 ACM ISBN 978-1-60558-323-05/08/11 . . . $5.00., Nov. 5, 2008, 11 pgs.
Thaker , et al., "Guardrail Baselines for Unlearning in LLMS", arXiv:2403.03329v3 [cs.CL] Jun. 11, 2024, Jun. 11, 2024, 14 pgs.
Uchida , et al., "EmbeddingWatermarks into Deep Neural Networks", arXiv:1701.04082v2 [cs.CV] Apr. 20, 2017, Apr. 20, 2017, 10 pgs.
Wang , et al., "A Survey on ChatGPT: AI-Generated Contents, Challenges, and Solutions", arXiv: 2305.18339v2 [cs.CY] Jul. 30, 2023, Jul. 30, 2023, 20 pgs.
Wang , et al., "An Economic Solution to Copyright Challenges of Generative AI", arXiv:2404.13964v4 [cs.LG] Sep. 9, 2024, Sep. 3, 2024, 23 pgs.
Yan , et al., "Arcane: An Efficient Architecture for Exact Machine Unlearning", Proceedings of the Thirty-First International Joint Conference on Artificial Intelligence (IJCAI-22) https://www.ijcai.org/proceedings/2022/556, Jul. 29, 2022, 8 pgs.
Zhang , et al., "Right to be Forgotten in the Era of Large Language Models: Implications, Challenges, and Solutions", arXiv:2307.03941v4 [cs.CY] Jun. 5, 2024, Jun. 5, 2024, 16 pgs.

* cited by examiner

230

240

250

CLOUD COMPUTING ENVIRONMENTS 375
AI SYSTEM 180
GEO-TAG PROCESSOR 182
VIRTUALIZED NETWORK FUNCTION CLOUD 325
VNE 330
VNE 332
VNE 334
300

BROADBAND ACCESS 110
190b
TRANSPORT LAYER 350
CONTENT SOURCES 175
VOICE ACCESS 130
WIRELESS ACCESS 120
190a
MEDIA ACCESS 140
190c

600

LOCATION-BASED, GENERATIVE ARTIFICIAL INTELLIGENCE

FIELD OF THE DISCLOSURE

The subject disclosure relates to location-based, generative artificial intelligence.

BACKGROUND

In recent decades, artificial intelligence (AI) has made rapid progress, revolutionizing various fields, including science, technology, education, healthcare, finance, transportation, and media. More recently, large multimodal AI models, such as ChatGPT, have been trained to process information and generate content across different modalities, such as text, images, videos, and speech. These models are trained on heterogeneous datasets, while fusing information from diverse sources to support various types of generative AI applications.

Generative AI is a type of artificial intelligence that can generate new data, images, text, and/or other media that may have never been seen before. Generative AI systems may utilize deep learning models that are trained on large datasets to learn patterns and generate new data based on those patterns. At least some generative AI techniques leverage unsupervised, generative, pre-trained language models, such as the Generative Pre-trained Transformer 3 (GPT-3)—an autoregressive language model that uses deep learning to produce human-like text.

GPT-3 is a third-generation language prediction model in a GPT-n series created by OpenAI. ChatGPT is a large language model (LLM) developed by OpenAI, designed to generate humanlike text in response to a given prompt or question. ChatGPT uses a deep learning model called a transformer specifically designed for language processing. The transformer is trained on massive amounts of text data and learns to predict the next word in a sentence based on the previous words. AI models, such as ChatGPT, may include billions of machine learning parameter.

In operation, a user inputs a prompt, which may be in the form of a question, and the AI model, e.g., ChatGPT, generates a response using its model, e.g., a transformer model, to generate a solution, that may be in the form of text, e.g., a new sentence, phrase or passage that is relevant to the input. Other AI models may be configured to generate output according to other modalities, e.g., in the form of text, audio, images, video, and combinations thereof.

BRIEF DESCRIPTION OF THE DRAWINGS

Reference will now be made to the accompanying drawings, which are not necessarily drawn to scale, and wherein.

DETAILED DESCRIPTION

Figure 1:
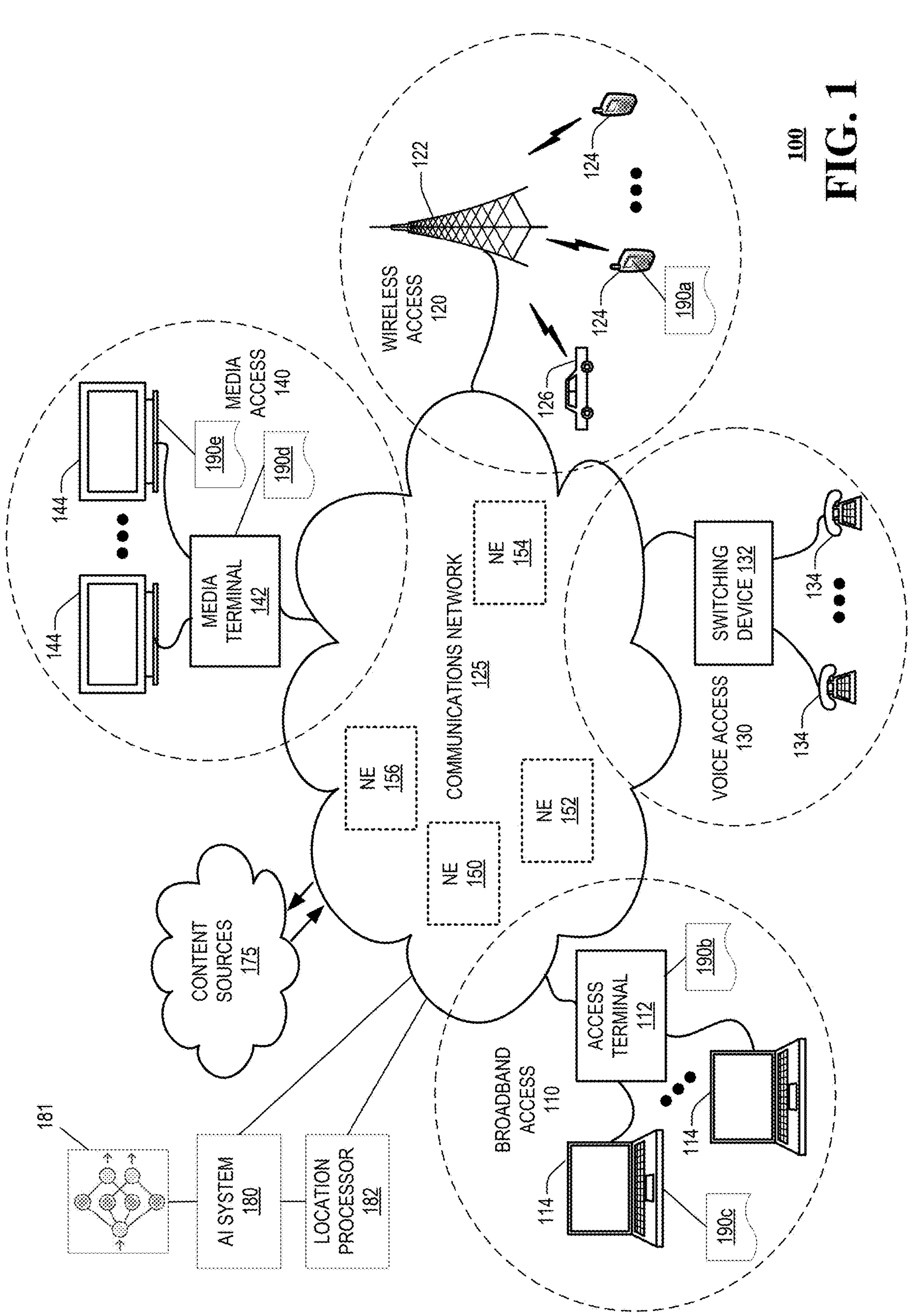
FIG. 1 is a block diagram illustrating an exemplary, non-limiting embodiment of a communications network in accordance with various aspects described herein.

The subject disclosure describes, among other things, illustrative embodiments for identifying a location associated with digital content, modifying the digital content according to the location and configuring a generative artificial intelligence (AI) model, e.g., a transformer model, according to the modified digital content to obtain location-aware generative AI model configured to provide generative AI solutions according to the location. Other embodiments are described in the subject disclosure.

One or more aspects of the subject disclosure include a system having a processing system including a processor and a memory that stores executable instructions. The instructions, when executed by the processing system, facilitate performance of operations that include identifying digital content, determining source location data associated with the digital content, and enriching the digital content according to the source location data to obtain location-enriched digital content. A generative AI model is configured according to the location-enriched digital content to obtain a location-aware, generative AI model configured to generate a solution according to the location-enriched digital content.

One or more aspects of the subject disclosure include a process that includes identifying, by a processing system including a processor, location data associated with digital content. The process further includes modifying, by the processing system, the digital content according to the location data to obtain modified digital content, and configuring, by the processing system, a generative AI model according to the modified digital content to obtain a location-aware, generative AI model. The location-aware, generative AI model is configured to generate a solution according to the modified digital content.

One or more aspects of the subject disclosure include a non-transitory, machine-readable medium including executable instructions that, when executed by a processing system including a processor, facilitate performance of operations. The operations include identifying a location associated with digital content, augmenting the digital content according to the location to obtain augmented digital content, and configuring a generative AI model according to the augmented digital content to obtain a location-aware, generative AI model. The location-aware, generative AI model configured is configured to generate a solution according to the augmented digital content.

Ethical use of data in generative AI is a growing concern. Large generative AI models are trained on pervasive data sets from a variety of sources, where the data records are fused into the models and become inseparable from them. This raises questions regarding data ownership and the use of personal data, artwork, and copyrighted content in generative AI models. For example, there remain questions whether people and businesses should be allowed to request the removal of their data from a model, even if the data were collected in public places; whether the use of data in generative AI should vary across different places based on local laws, e.g., local copyright laws; whether local laws and regulations regarding data misuse and harmful content should be enforced; and whether people and organizations should verify that their data records have been removed from models or are being used properly. The present disclosure addresses location-based, e.g., geospatial, aspects of data ownership in large generative AI models by presenting generative AI systems, processes, software and applications that are aware of data ownership and/or location provenance, e.g., based on spatio-temporal features of the data and/or the data usage. According to the disclosed techniques, aspects of location-aware AI governance are able to mitigate at least some of the risks associated with generative AI, support ethical use of the data and/or AI techniques, in local as well as global applications.

Referring now to FIG. 1, a block diagram is shown illustrating an example, non-limiting embodiment of a communication network 100 in accordance with various aspects described herein. For example, the communication network 100 can facilitate in whole or in part identifying a location associated with digital content, enhancing the digital content according to the location and configuring a generative artificial intelligence (AI) model according to the enhanced digital content to facilitate generative AI solutions according to the location. In particular, a communication network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communication network 125 includes a plurality of network elements (NE) 150, 152, 154, 156, etc., for facilitating the broadband access 110, wireless access 120, voice access 130, media access 140 and/or the distribution of content from content sources 175. The communication network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminals. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communication network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the communication network 100 includes an AI system 180 configured to provide an output, e.g., in the form of a solution responsive to an input, e.g., a prompt, which may be in the form of a question, instruction or request. In at least some embodiments, the AI system 180 configures an AI model 181, sometimes referred to as a transformer model, which may be used to generate a solution or response relevant to the prompt. For example, the AI model 181 may include an artificial neural network (ANN) that incorporates one or more interconnected layers of nodes, sometimes referred to as artificial neurons. At least some multi-layer AI models may be referred to as deep neural networks (DNN), suggesting that the AI models include an input layer, an output layer and at least one intermediate or hidden layer. At least some nodes, e.g., artificial neurons, receive signals from one or more interconnected nodes and provide outputs based on combinations of the inputs according to a process sometimes referred to as an activation function. Strengths of receives signals may be adjusted according to weights that may be determined according to a learning or training process.

In at least some embodiments, the AI system 180 may determine, control and/or otherwise adjust one or more aspects of the AI model 181 or network, such as numbers of layers, numbers of artificial neurons, activation functions, weights, training and/or re-training. Training may include supervised learning, unsupervised learning and/or combinations of supervised and unsupervised learning. By way of example, supervised learning may utilize training data that may be labeled with explicit input-output pairs, such that a solution, e.g., an output obtained using the AI model, may be compared to the labeled data, e.g., an input according to the input-output pair, to determine an error value. In at least some embodiments, training data may be obtained from the content sources 175, e.g., in the form of text, audio, speech, images, photographs, graphical images, video, audiovisual and combinations thereof. An error value may be measured between a solution, prediction or output obtained via the AI model 181 and the corresponding input of the labeled input-output pair. It is understood that a measure of the error may be used in the training and/or retraining process, such that the AI model 181 may adjust one or more parameters responsive to the determined error in an effort to reduce and/or otherwise minimize the error.

The training and/or re-training process may continue until the error has been reduced to some tolerable level, e.g., below a predetermined error threshold. In an unsupervised learning scenario, the AI model 181 may be provided with unlabeled data sets, e.g., training data containing only the input data, and left to discover the patterns in the data and build a new, e.g., trained, AI model from it. Having established that the AI model 181 has been suitably trained, the AI system 180 may be configured to receive prompts, which may be in the form of questions and/or requests. The AI system 180 may utilize the suitably trained AI model 181 to generate an output or response, referred to herein generally as a solution, which is relevant to the prompt. In at least some embodiments, the AI system 180 includes a computer server operating AI software configured to train the AI model 181, and/or to evaluate the effectiveness of such training, and/or to coordinate prompting, and/or to obtain and/or otherwise process a solution according to the AI model 181.

According to the illustrative embodiment, the communication network 100 also includes a location processor 182. The location processor 182 may be in communication with one or more of the AI system 180 and/or the AI model 181 and/or communication network 125. The location processor 182 may be configured to identify and/or otherwise determine one or more locations. The locations may be relevant to one or more of the AI system 180, the AI model 181, digital content and/or data upon which the AI model 181 has been trained. Without limitation, the location may be determined from one or more of a prompt, the AI model 181, the location processor 182, training data as may be used during a training, re-training process and/or a solution. It is understood that the location may be determined from digital content as may be obtained from the content sources 175 and/or processed by one or more of the AI system 180, the location processor 182 and/or the AI model 181. It is understood that, without limitation, the content sources 175 may include digital content items, which may include digital data representing text, audio, speech, images, photographs, graphical images, video, audiovisual and combinations thereof.

In at least some embodiments, the digital content may be enriched and/or otherwise enhanced according to information other than location information. For example, the location processor 182 may be configured to provide time and/or date information, e.g., in the form of one or more timestamps. Such timestamps can be associated with and/or incorporated into digital content upon which the AI model 181 may be trained. By way of example, a timestamp may relate to one or more of the AI system 180, the AI model 181, the digital content and/or any other data upon which the AI model 181 has been trained. It is understood that in at least some embodiments, other information, such as the timestamp(s), may be obtained in a similar manner as used to obtain the location information, e.g., from a location determining device, such as a GPS receiver. Without limitation, any additional information obtained and/or otherwise used to enrich digital content can be used alone or in combination with the location information. For example, a date and/or time of usage by the AI system may be compared to a date associated with the digital content, such that the applicability of a requirement, e.g., copyright, may be evaluated as being applicable or not based on the date, the location or a combination thereof.

In some embodiments, the location processor 182 may determine a location explicitly, e.g., from the content itself. Examples of explicit location may include information within the content, e.g., text or images that explicitly identify a name, an address, a town, a city, a country, a recognizable locations, e.g., a famous building, structure, natural landscape, and the like. In at least some embodiments, explicitly added metadata can be included in the training data, e.g., in a description of images and/or videos. By way of example, the metadata can contain information on the location, time, owner, source, and copyrights of the data. Although the various examples disclosed herein refer to location processing and/or determining locations, it is understood that the digital content processors may be configured to identify, discover, estimate and/or otherwise determine one or more of the location, time, owner, source and copyrights of the data as well. For example, the artist "Grant Wood" could be identified and included as part of the metadata of a digital content item related to a Grant Wood painting, e.g., a photograph and/or image of the painting. Similarly, an owner of the painting and/or the exhibition location might also be identified and included in the metadata. Such enhancing information, when identified and associated with digital content, can facilitate implementing evaluation and/or detection of prompts that may relate to some rule, requirement and/or regulation that may also relate to a location, e.g., possibly violating a local regulation. Alternatively, or in addition, the location processor 182 may determine enhancing information, such as a location, time, owner and/or source implicitly, which may also be implied from the content itself. Examples of implicit information related to location may include information within the content that implies a location, such as an architectural style, a manner of dress, a language, a dialect, an accent, a colloquialism, an expressed mannerism, a landscape, and the like. Ownership may be implied by an individual represented as being in possession of an object, e.g., holding it and/or housing it. Time may be implied by clothing styles, image quality, and so on.

In at least some embodiments, the location processor 182 is configured to associate a determined location, e.g., a location determined according to a particular digital content item, with the corresponding content. This process may sometimes be referred to as geo-tagging the digital content in which geo-paired information is stored within and/or in close association with the digital content. For example, the location processor 182 may generate location data corresponding to a determined location. Without limitation, the location data may include a name, an address, a town, a city, a country, geocoordinates, e.g., a latitude and longitude, coordinates according to a map and/or other locational reference and so on. In at least some embodiments, the location data may be provided as metadata that can be associated with a corresponding digital content item. Accordingly, the AI system 180 and/or the AI model 181 may process the digital content, i.e., the data, as well as any corresponding metadata. For example, a trained AI model 181 may retain locations, e.g., in the form of metadata, corresponding to content upon which it was trained.

Alternatively, or in addition, the digital content may be modified according to the location data to obtain location-modified digital content. For example, the location data may be copied, encoded and/or otherwise incorporated into the digital content. By way of example, the location data may be included into a digital content item as a digital watermark. Implicitly adding metadata to content can be based on digital watermarking. Watermarking is an embedded signal, with ownership and copyright information, in digital content like video, audio, and images. A watermark is typically unnoticed by ordinary users, is resilient to an addition of low-levels of noise to the file and remains available for identification and/or interpretation by one or more of the AI system 180, the AI model 181 and/or the location processor 182. Digital watermarking has been suggested recently as a way to mark content that is created by generative AI, to fight deepfakes. This can be done by jointly training encoder and decoder models so that for a given description the encoder adds the description to an image as a watermark and the decoder extracts the description. Although the watermarking example refers to location data, it is understood that the same technique may be applied to other related data, such as one or more times, owners, sources, copyrights, trademarks, identities of individuals, or privacy rights, to obtain related data alone or in any combination including in combination with location data.

Mapping data to locations is not always easy, but it could help with data-ownership protection and the enforcement of local regulations, as illustrated in an earlier example. For example, such a mapping can be used in a location-aware unlearning process. Alternatively, or in addition, such mappings can be used to facilitate tracking other regulated activities, such as copyright violations, plagiarism, lack of authenticity, and data misuse, to name a few.

The effectiveness of watermarks might depend on what it would include and how difficult it would be for people to add it and interpret it. The advantage of including verifiable location information in watermarks relates to the ease of acquiring the information and interpreting it, e.g., media items from the location of the New York Times building might be treated differently from media items whose origin is in a building of the Korean Central News Agency (KCNA) in Pyongyang, North Korea, regarding authenticity and copyrights. It is envisioned that in at least some embodiments, the location processor 182 may be configured to evaluate an authenticity and/or reliability of any representation of locations, owners, times. In at least some embodiments, the location processor 182 may be configured to evaluate possible ambiguity as may result from toponyms rather than coordinates, thus verifying the truthfulness of geotags, e.g., based on network provided information, to reduce the possibility of forging geotags.

According to the illustrative embodiment, at least some of the mobile devices 124, the access terminal 122, the data terminals 114 and/or the media terminal 142, and/or display devices 144 may be configured with functionality, e.g., in the form of source code, a client and/or an AI user application program **190*a*, 190*b*, 190*c*, 190*d*, 190*e*, generally 190. The AI user application program 190 may be configured to interact with one or more of the AI system 180, the AI model 181 and/or the location processor 182. For example, the AI user application program 190 may provide a user interface to facilitate generation of prompts according to user interactions and/or input. Alternatively, or in addition the AI user application program 190 may provide a user interface to facilitate generation of a solution and/or response to the prompt. It is understood that the AI user application program 190 may operate according to one or more different modalities, such as text, audio, voice, images, video, and combinations thereof. The modalities of the prompt and the solution may be similar. Alternatively, or in addition, the modalities of the prompt and the solution may differ. For example, a user may generate a prompt according to text and/or spoken instructions as may be interpreted with a speech-to-text function, requesting generation of an image. Accordingly, the AI system 180 may process the prompt, using the AI model 181** to generate a solution in the form of an image as requested and/or otherwise required by the prompt.

The process of identifying and/or associating location data with content may include identifying location information corresponding to particular points of interest geolocations, wherein location information for the points of interest geolocations is also stored and associated with the geo-paired information corresponding to the geolocations. This may be geo-paired information about the point of interest geolocation, such as historical geo-paired information relating to a point of interest geolocation, a historical account of an event occurring at a point of interest geolocation, information about the creation of a structure at a point of interest geolocation and the like. In other words, the geo-paired information may be about the geology, history, news, topics of interest, or any other information regarding the point of interest, e.g., that is within a predetermined distance to a location of interest, such as a location of a user device, e.g., hosting an AI user application program 190, as may be used for initiating a prompt and/or receiving a solution, a location of the AI system 180, a location of the AI model 181, a location of the content sources 175, and so on.

Due to the use of data from a variety of sources and the complexity of the models, overseeing the content generation process, associating generated content with the data sources, and guaranteeing the safety of the technology are often difficult—it is challenging to cope with data ownership and to address legal, social, and business requirements regarding copyrights, the right to be forgotten, plagiarism, and/or offensive content.

The right to be forgotten refers to laws and regulations that protect the right of individuals to request the removal of their private data from public data sources and online services, e.g., Article 17 of the General Data Protection Regulation (GDPR) of the European Union. It can be applied in cases where there is no public interest in keeping records that could cause harm to an individual, e.g., removing from search engines records on petty crimes of minors. Similarly, the California Consumer Privacy Act (CCPA) requires the deletion of personal information collected from consumers, when requested. There is, however, an ongoing debate on this right due to a conflict with other rights like the "right to know," "freedom of information," and "freedom of speech." Laws on this right vary across the world.

Note that the right to be forgotten is related to privacy, but its focus is on the removal of personal information from public repositories, whereas privacy typically deals with restrictions on how personal data is collected, stored, and shared, e.g., applying anonymity methods to all the records rather than the removal of specific records as requested.

Like the right to be forgotten, copyrights, trademarks and protection of intellectual property are often interpreted and enforced differently in various places. A use of text or images that is considered plagiarism in some places may not be considered as such in other places. So, for generative AI, the question of which law should be applied is not only a legal question but also a technological question. To illustrate this, consider the following example.

Figure 2A:
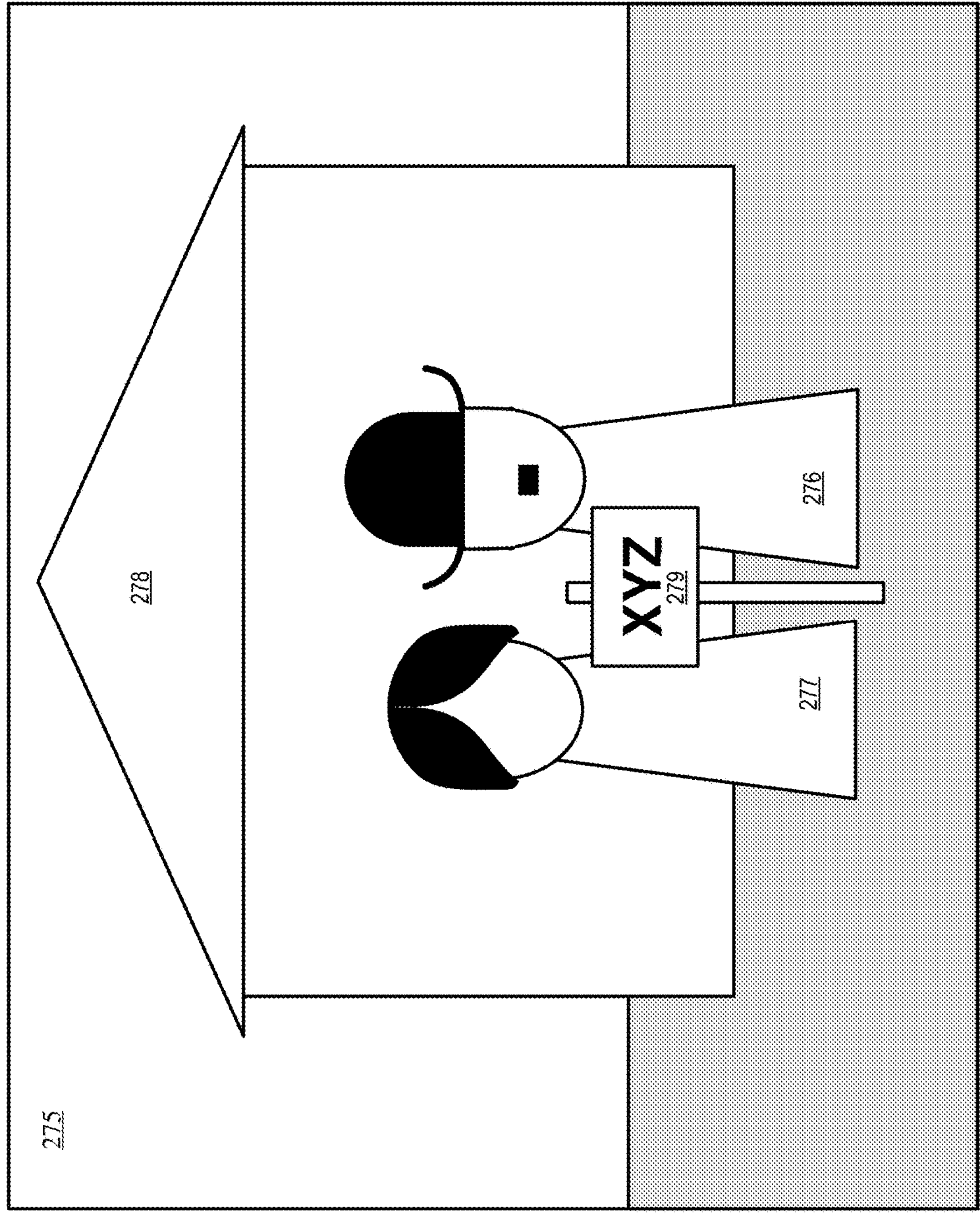
FIG. 2A is a schematic diagram illustrating yet an example, non-limiting embodiment of a location-based, generative AI solution as may be obtained with a generative AI system, in accordance with various aspects described herein.

A user in Iceland provides the following prompt to an online generative AI service to create an artistic work. According to the illustrative example, the prompt request "Create a painting in a Grant Wood style of Charlie Chaplin and Jane Smith standing in front of the Drumthwacket house in Stockton Street, in Princeton, New Jersey, while holding a banner saying XYZ", where XYZ is an offensive statement against the prime minister of New Zealand. FIG. 2A provides a schematic diagram illustrating an example, non-limiting embodiment of a location-based, generative AI solution 275 as may be generated according to the example prompt. The generative AI solution portrays in image of a painting 275 in a Grant Wood style of Charlie Chaplin 276 and Jane Smith 277 standing in front of the Drumthwacket house 278 in 354 Stockton Street, in Princeton, New Jersey, while holding a banner 279 saying XYZ", where XYZ is an offensive statement against the prime minister of New Zealand. The result, if simply provided according to the request, could violate one or more different local laws and regulations, such as: (i) the copyrights, and/or trademark rights and/or any other applicable ownership rights, e.g., of the Art Institute of Chicago, as may be applicable to exhibits include paintings of Grant Wood; (ii) a trademark right of the image of Charlie Chaplin—a trademark held by a legal entity registered in Nyon, Switzerland; (iii) privacy rights of Jane Smith—a private individual who, depending on the law where she lives, may have the right not to appear in a generated image without her consent; (iv) U.S. architectural copyrights of the Drumthwacket house and/or privacy rights of the residents of that house as may exist, by merely having the Drumthwacket house appear in the background; and (v) violation of applicable laws by the statement against the prime minister of New Zealand, as may violate the law in New Zealand. In addition, there could be a violation of the law of Iceland, from where the prompt was sent to the service. The computation itself could be performed by a company that is registered in the USA on servers that reside in some other country, say Ireland. On the one hand, any violation of a local law requires associating the action and the rights with the place where these laws and rights apply. On the other hand, in generative AI applications, tracking all these places without the proper technology would be practically impossible.

The example scenario illustrates that, in generative AI, associating a single location to an act of copyright infringement is futile. Moreover, organizations that handle global cyber and intellectual property crimes, like the Interpol and the US Department of Justice, need new technology to cope with an extensive use of generative AI and to support the association of created content with locations and data ownership. The techniques disclosed herein apply geospatial tools, location data, and/or data ownership information in generative AI to facilitate tracking of data as may be relevant to identifying and/or tracking data (mis)use and mitigate risks that are related to the right to be forgotten, plagiarism, copyright violations, and, more generally, data ownership. It should be appreciated that the techniques disclosed herein promote trustworthiness in data and data practices, including geospatial data.

Figure 2B:
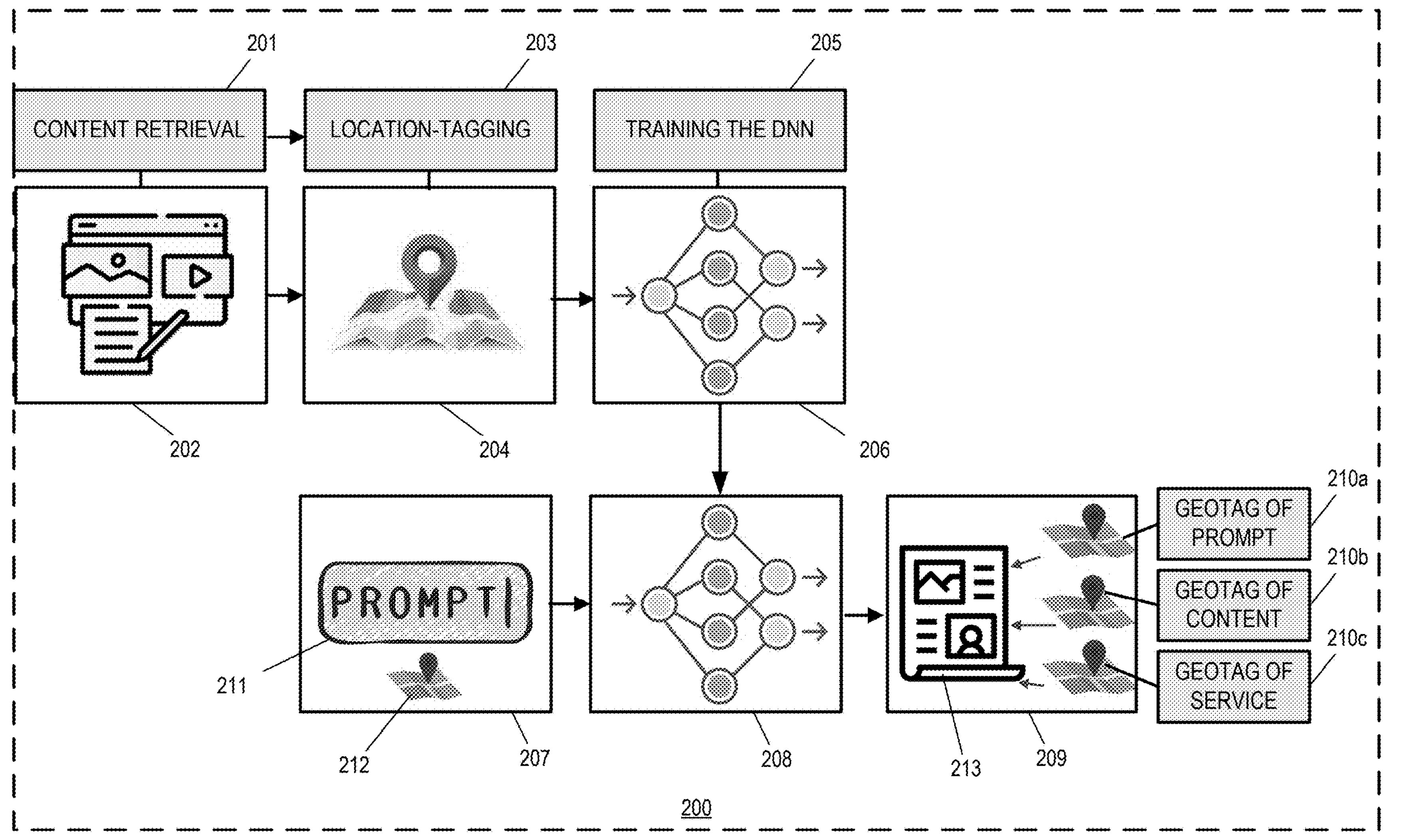
FIG. 2B is a block diagram illustrating an example, non-limiting embodiment of a location-based, generative artificial intelligence (AI) system functioning within the communication network of FIG. 1 in accordance with various aspects described herein.

FIG. 2B is a block diagram illustrating an example, non-limiting embodiment of a location-based, generative AI system 200 functioning within the communication network 100 of FIG. 1 in accordance with various aspects described herein. In at least some embodiments, the location-based, generative AI system 200 can be configured to perform one or more of identifying a location associated with digital content, modifying the digital content according to the location and/or configuring a generative AI model according to the modified digital content to obtain location-aware generative AI model. It is understood that in at least some embodiments, such a location-aware generative AI model can be configured to provide generative AI solutions according to one or more locations. To this end, the location-aware generative AI model can facilitate generation of responses or solutions according to one or more locations. For example, a solution may be obtained via the generative AI model to diminish, avoid and/or otherwise exclude digital content related to a location. Alternatively, or in addition, a solution may be obtained via the generative AI model to enhance, promote and/or otherwise include digital content related to a location.

In more detail, the example location-based, generative AI system 200 includes a content retrieval module 201 configure to identify, retrieve and/or otherwise access digital content 202. The location-based, generative AI system 200 further includes a location tagging module 203 configured to identify one or more locations associated with digital content. According to the illustrative embodiment, the location tagging module 203 is in communication with the content retrieval module 201. The location tagging module 203 can be configured to determine one or more locations and to generate location data corresponding to the determined location(s). In at least some embodiments, the location tagging module 203 may be configured to enhance and/or otherwise modify the digital content 202 according to the location data to obtain location-enriched digital content 204. This process may be referred to as geotagging, which may include assigning one or more locations, e.g., geotags, to the digital content 202.

The digital content 202 can include, without limitation, text, audio, images, e.g., photographic images, video, graphics, hypertext documents, e.g., web pages, social media, gaming media, augmented reality media, virtual reality media, streaming media computer code, e.g., application programs, and/or other media, including computer-readable media, synthetic data for simulations and testing, digital maps, speech, music, sounds, movement instructions for robots and autonomous devices, sensory responses for haptic devices, generative AI generated data, and any combinations thereof. The digital content 202 may be obtained from one or more digital content sources, e.g., the content sources 175 of the example communication network 100 (FIG. 1). The content sources 175 can include local content repositories, e.g., local storage devices or drives, network accessible content repositories, and combinations thereof. In at least some embodiments, the content retrieval module 201 may be in communication with one or more digital content sources via one or more communication networks, e.g., a personal area network (PAN), such as a Bluetooth network, a local area network (LAN), such as an Ethernet network, a metropolitan area network (MAN), and/or a wide area network (WAN), such as the Internet and/or the World Wide Web.

The location tagging module 203 can be configured to identify one or more locations associated with the digital content 202. In at least some embodiments, the content retrieval module 201 can be configured to determine a location from the digital content 202 itself, which may explicitly refer to and/or otherwise indicate one or more locations. For example, the digital content 202 may include text that identifies one or more locations, audio that refers to one or more locations, images and/or video that portray one or more locations, and so on. Alternatively, or in addition, the content retrieval module 201 can be configured to determine a location from aspects of the digital content 202 that imply and/or suggest one or more locations. For example, the digital content 202 may include text and/or audio in a language, a dialect, an accent, and/or a colloquialism that may suggest and/or otherwise imply one or more locations. Other implicit references may include an expressed mannerism, a custom, a landscape, and so on.

Alternatively, or in addition, the location tagging module 203 can be configured to identify one or more locations associated with a source or sources of the digital content 202. This may include a location(s) of equipment hosting the content retrieval module 201, e.g., a content retrieval server, and/or equipment storing the retrieved digital content 202, e.g., a content data storage device or system, such as a cache memory of the content retrieval server, a local storage device and/or network accessible digital content storage devices, and the like.

It is understood that the location data may refer to one or more than one location for a particular item of the digital content 202. For example, the location data may identify one or more locations determined explicitly and/or implicitly from the digital content 202 itself, one or more other locations associated with the content retrieval module 201, one or more locations of equipment storing retrieved digital content 202, and/or one or more locations associated with other servers, systems and the like from which the digital content 202 was obtained and/or otherwise processed, e.g., via the location tagging module 203.

The location data, without limitation, may identify a particular location, such as a geographic location as may be determined according to a geographic reference, e.g., a latitude, a longitude, and/or an elevation. Other indicators of a location may include an address, e.g., a street and/or mailing address. Still other indicators of location can include a country, a state, a city or town, and or a neighborhood. In at least some embodiments, a location may be associated with a named entity, such as a geographic location, e.g., Central Park, a recognizable facility and/or building, e.g., the Empire State Building, a business and/or educational campus, such as Columbia University, and so on.

It is understood that in at least some embodiments, the location tagging module 203 may process location to prepare location data for incorporation into the generative AI model 206 to obtain a location-aware, generative AI model 208. For example, the location tagging module 203 may determine a street address associated with a digital content item and convert the street address to another location format. Thus, a location determined according to one format may be converted and/or otherwise encoded into another formation. By way of example, such encoding may convert a location to geographic coordinates, e.g., a latitude and longitude. In at least some embodiments, the encoding may include a region, e.g., a geolocation and a range and/or boundary. Alternatively, or in addition, a location as may be determined according to geographic coordinates may be converted, e.g., by the location tagging module 203, into another format, such as a country, a state, a town, a region, a jurisdiction, and so on. In some embodiments, the location-enriched digital content 204 may be configured to store location information according to a preferred format, e.g., geographic coordinates. Alternatively, or in addition, the location-enriched digital content 204 may be configured to store location information for the same location according to more than one format, e.g., geographic coordinates and a country and/or jurisdiction.

The location data can include one or more of text, images, graphics, audio, video, encoded data, e.g., machine-readable data and the like. In at least some embodiments, the location data can be allocated to and/or otherwise provided in metadata of the digital content 202 to obtain the location-enriched digital content 204. Namely, the retrieved digital content 202 may be enriched by the addition of metadata that includes the location data and/or existing metadata can be enhanced or updated to incorporate the location data. Alternatively, or in addition, the location data may be incorporated into the retrieved digital content 202 itself. For example, the retrieved digital content 202 may be enhanced by adding the location data to the digital content. Alternatively, or in addition, the location data may be encoded and incorporated into the retrieved digital content 202 according to the encoding. At least one example of encoding includes incorporating a digital watermark into an image, e.g., a photograph, a graphic and/or video. The digital watermark may be barely perceptible, if at all, to a user, while sufficiently incorporating the location data in a retrievable manner. For example, the location-enriched digital content 204 that has been directly enhanced may be decoded to obtain the location data.

It is understood that in at least some instances, more than one location may be identified for a particular digital content item. This may include an explicit location reference in the digital content item, a separately implied location reference based on the digital content item, a location of a source from which the digital content item was obtained, and so on. In at least some embodiments, the location data may include more than one location, such that the location-enriched digital content 204 may include the multiple locations. In at least some embodiments the location data may include an indication as to a type of location data, e.g., a geographic location, an address, and/or a source of the location data, e.g., an explicit reference from within the digital content item versus an implied reference. It is understood that in at least some instances, the location-enriched digital content 204 may be configured to include the location data and a corresponding indication as to a source upon which a location determination may have been determined. The sources may be categorized, such that metadata and/or encoded data applied to the location-enriched digital content 204 can also include one or more indications as to the source of the location data, e.g., explicit, implicit, storage device location and so on.

Alternatively, or in addition, the location tagging module 203 may be configured to evaluate any sources of location information as may be determined and/or otherwise identified, e.g., by the location tagging module 203. For situations in which there may be more than one source of location data, the evaluation may process and/or otherwise organize the location data, e.g., according to the locations, the sources and/or methods to obtain organized location data. In at least some embodiments, organized location data is used to obtain the location-enriched location digital content 204. Without limitation, organization of the location data may include assigning a weight and/or a rank to a particular location obtained via a particular method. In at least some embodiments, the ranks and/or weights may be processed to facilitate an ordering of the multiple locations associated with a particular digital content item according to their respective ranks and/or weights. Alternatively, or in addition, a particular location may be included and/or excluded based on its rank, its weight and/or the particular source and or method by which the location was obtained.

By way of example, a photographic image may include a sign that explicitly identifies a particular location, e.g., Washington Sq. This information alone may be insufficient to unambiguously determine an actual location. Namely, there may be more than one location associated with Washington Sq., e.g., a park in New York City versus a shopping mall in Portland, OR. In such instances, the photographic image may contain other indicators, such as the landmark arch of Washington Sq. Park. In such instances, the location tagging module 203 may evaluate the textual content of the sign as well as other aspects, e.g., the visual aspect of the arch, to determine to a greater confidence that the location is in New York City. Thus, the location tagging module 203 may evaluate two or more separate location indicators to determine a location and/or to establish a reliability of the location. To the extent the image merely showed the Washington Arch, e.g., without the textual reference, there would remain a possibility the structure may be located elsewhere. Accordingly, the location tagging module 203 may identify New York City as a likely location, but having a lower rank, weight or certainty than in the preceding example in which the location was disambiguated by multiple aspects of the digital content 202.

In some embodiments, multiple locations may be provided for the same content within the location-enriched digital content 204, possibly according to a weighting, ranking or ordering or simply a listing. Alternatively, or in addition, the location tagging module 203 may perform an enhancement and/or disambiguation process to resolve ambiguity of a location, such that a single location, or perhaps a smaller list of possible locations, may be identified as a most likely location(s). Accordingly, the more or most likely location may be included within the location-enriched digital content 204, while a less likely location may be excluded from the location-enriched digital content 204.

The example location-based, generative AI system 200 further includes the generative AI model 206 and an AI model configuration module 205. The generative AI model 206 may include any suitable model that may be configured, e.g., trained to generate solutions that may be in the form of predictions responsive to inputs as may be obtained in the form of prompts, inquiries, and/or requests. In at least some embodiments, the generative AI model 206 incorporates an ANN configuration that may include multiple layers, including hidden layers according to a DNN. The AI model configuration module 205 may be configured to initiate a learning or training process to initially configure the generative AI model 206 to obtain the location-aware, generative AI model 208. Alternatively, or in addition, the AI model configuration module 205 may be configured to conduct an ongoing training and/or a re-learning process. In at least some embodiments, the retraining and/or re-learning process may include an unlearning process, e.g., in which the generative AI model 206 is configured and/or reconfigured to extract, remove, obscure and/or otherwise avoid data of the location-aware, generative AI model 208. For example, the AI model configuration module 205 may be configured to train and/or otherwise configure the generative AI model 206 according to the location-enriched digital content 204 to obtain the location-aware, generative AI model 208.

In at least some embodiments, the AI model configuration module 205 may adjust the location-aware, generative AI model 206 according to one or more locations to obtain the location-aware, generative AI model 208. For example, the AI model configuration module 205 may adjust the location-aware, generative AI model 206 to promote and/or otherwise enhance solutions based on digital content associated with one or more locations. Alternatively, or in addition, the AI model configuration module 205 may be configured to inhibit and/or exclude from solutions digital content 202 associated with one or more locations. To the extent that the location-aware, generative AI model 208 has been configured and/or otherwise adapted, e.g., by the AI configuration module 205 according to a location, the resulting model may be referred to as a location-adjusted AI model.

In at least some embodiments, the AI model configuration module 205 may adjust the generative AI model 206 according to one or more locations. For example, the AI model configuration module 205 may adjust the generative AI model 206 to obtain the location-aware, generative AI model 208, which may be configured to promote and/or otherwise enhance solutions based on digital content associated with one or more locations. Alternatively, or in addition, the AI model configuration module 205 may be configured to inhibit and/or exclude from solutions digital content 202 associated with one or more locations.

In at least some embodiments, the location-based, generative AI system 200 can be configured to perform one or more of receiving a prompt configured to solicit a generative AI solution from the location-aware, generative AI model 208, identifying a solution location according to the prompt, determining a location-based rule according to the solution location, and/or adapting the generative AI solution according to the location-based rule. In at least some embodiments, the location-based rule can be used to modify a time, place and/or manner by which the model is applied. For example, the location-based rule can restrict access to at least some data and/or access to inferences based on at least some data, according to a location of the user and/or the service and/or the place where the data were collected. By way of example, a location-based rule can be applied according to access-control restrictions, e.g., access-control views in database management systems. According to the illustrative example, the location-based, generative AI system 200 includes a prompt module 207, a location-aware, generative AI model 208 and a solution module 209 that in at least some embodiments may be adapted to perform post processing on a solution. The prompt module 207 can be configured to receive and/or otherwise generate a prompt 211 and to provide an input to the location-aware, generative AI model 208 based on the prompt.

Without limitation, the prompt 211 may be in the form of a question, an inquiry, an instruction and/or a request. For example, the prompt 211 may be obtained from a user interface in the form of a textual input, e.g., a word, a phrase a sentence, and/or a passage containing more than one sentence. Alternatively, or in addition, the prompt 211 may be obtained via a selection from a menu, e.g., a selection from among a list of prompts or prompt segments. Other modes of input include speech, text obtained from speech, e.g., using a speech-to-text conversion, gestures, e.g., visual gestures as may be obtained from a video camera, and so on. By way of example, the prompt 211 may include a request for a solution that includes generated content, e.g., a textual document, an image, audio, video and/or any other modality as may be achievable via the location-aware, generative AI model 208. The prompt module 207 provides an input, e.g., the prompt 211 and/or some processed version of the prompt, as an input to the location-aware, generative AI model 208.

It is understood that in at least some embodiments, prompt location data 212 may be determined, identified, obtained and/or otherwise generated according to the prompt 211. In at least some embodiments, the prompt module 207 may be configured to determine, identify, obtain and/or otherwise generate the prompt location data 212. For example, the prompt module 207 may be configured to identify the prompt location data 212 according to any of the various techniques disclosed herein for identifying location data. This includes determining the prompt location data 212 explicitly, e.g., from the prompt 211 itself. Examples of explicit location may include information within the prompt 211, e.g., text or images that explicitly identify a name, an address, a town, a city, a country, a recognizable locations, e.g., a famous building, structure, natural landscape, and the like. Alternatively, or in addition, the prompt module 207 may determine a location implicitly, which may also be implied from the prompt 211 itself. Examples of implicit location may include information within the content that implies a location, a manner of dress of a prompting user, a prompt language, a prompt dialect, a perceived prompt accent, a colloquialism, an expressed mannerism, and so on.

In at least some embodiments, the prompt location data 212 may be obtained from a location associated with equipment of a prompting user, e.g., a computer terminal and/or a mobile device, such as a mobile phone. In at least some embodiments a self-reported location is obtained from equipment of the prompting user, e.g., geocoordinates as may be reported by a location receiver of the user equipment and/or an approximate location provided by a network service provider. For mobile users, the network provider may determine an approximate location based on a location of a wireless access point, and/or time difference of arrival, phase difference, amplitude differences and so on of signals exchanged between equipment of the network service provider and the user equipment.

It is envisioned that the prompt module 207 may utilize multiple sources for obtaining the prompt location data 212. The multiple sources may be identified and/or otherwise utilized to obtain respective prompt location data 212, e.g., from the prompt 211 itself, from a location of equipment receiving and/or otherwise processing the prompt, and so on. It is conceivable that in at least some instances, locations obtained via different sources may agree, however, it is understood that in at least some instances they may disagree. Accordingly, in some embodiments, the prompt location data 212 may include a single, e.g., most likely location. Alternatively, or in addition, the prompt location data 212 may include multiple locations, possibly associated with a ranking, a weighting, an ordering and/or a reliability value. For example, location data obtained from a network, e.g., a network service provider, may be deemed to be more reliable than location information obtained from the prompt 211 itself. For example, a prompt may be received from a user in Illinois, requesting a generative AI solution that would be presented to a requesting user in California. It is envisioned that in at least some embodiments, the prompt module 207 may be configured to identify such prompt possibilities, e.g., distinguishing between actual locations and requested locations, such that the location-based, generative AI systems 200 can respond accordingly.

In at least some embodiments, the prompt module 207 may be in communication with the location tagging module 203 and/or the AI model configuration module 205. For example, in at least some embodiments, the location aware, generative AI model 208 may be prepared, e.g., trained, re-trained, and/or otherwise reconfigured according to the prompt location data 212. Consider a location-based requirement associated with a location of the prompting user, such that a generative AI solution 213 depends upon the prompt location data 212. This may facilitate a business and/or legal requirement that restricts aspects of the location-aware, generative AI model 208 from contributing to the generative AI solution 213, based on a location associated with the location-enriched digital content 204.

In at least some embodiments, the location-based, generative AI systems 200 includes a solution module 209 configured to generate, post-process, stage and/or otherwise present the generative AI solution 213. The solution module 209 can be configured to receive an output, e.g., a generative AI solution from the location-aware, generative AI model 208 based on one or more of the prompt 211, the prompt location data 212, the location-enriched digital content 204, and/or the location-aware, generative AI model 208. The location-based, generative AI systems 200 can be configured to produce a generative AI solution 213 that may be based on one or more of the prompt, the location-aware, generative AI model 208 and in at least some embodiments, further post processing as may be performed by the solution module 209. In at least some embodiments, post processing may contain further adjustment according to location. For example, the generative AI solution 213 may be filtered and/or otherwise modified or adjusted to adjust location related content. For example, the generative AI solution may be filtered to remove and/or modify content of the generative AI solution 213 related to a particular location. Accordingly, the generative AI solution 213 may be responsive to content associated with the prompt 211, e.g., according to a prompt geotag **210*a*. Alternatively, or in addition, the generative AI solution 213 be responsive to content associated with one or more of a content geotag 210*b* of the retrieved digital content 202 and/or a service geotag 210*c* as may relate to one or more services in relation to operation of the location-based, generative AI system 200, e.g., an AI service as may be represented by the AI model configuration module 205 and/or the location-aware, generative AI model 208**.

With existing technology, there is no simple way to delete records from complex AI models. Many AI models have become large, intricate, and expensive. For example, GPT-4 has 1.8 trillion parameters across 120 layers. It was trained over about 13 trillion tokens at a significant cost. It would be impractical to frequently retrain such a model, and because the loss function is typically non-convex, removing specific information from a model is difficult. It is envisioned that such large models may contain digital content 202 that is private, copyrighted, trademarked, toxic, e.g., including harassment, violence, racism, offensive language, and misinformation, or controversial in different ways. In at least some embodiments, e.g., for large generative AI models 206, one or more of the content retrieval module 201, the location tagging module 203 and/or the AI model configuration module 205 can be configured to detect harmful content, and in at least some embodiments to removed prior to training and remove it. For example, a pre-filtering process can be performed to evaluate the content as it is retrieved by the content retrieval module 201, and/or as it is associated with one or more locations by the location tagging module 203, and/or as it is evaluated or prepared for training data by the AI model configuration module 205. For example, the harmful content can be classified using a dedicated model that is trained based on manually labeled data. Alternatively, or in addition, in some AI-based applications filters can be applied to detect and remove harmful results.

Effectively tracking the geospatial provenance of generated content is complex, as illustrated in a previous example. The goal is to address local rules regarding collection, storage, and use of data, given that there could be a time lag between collection and usage. Thus, the addition of location information should involve the entire content generation process and the place of use, as illustrated in FIG. 2B. This opens important technical, operational and/or research opportunities related to collecting, verifying, and/or embedding the location information, to generate trustworthy, privacy-preserving, and easy to manage watermarking signatures.

Figure 2C:
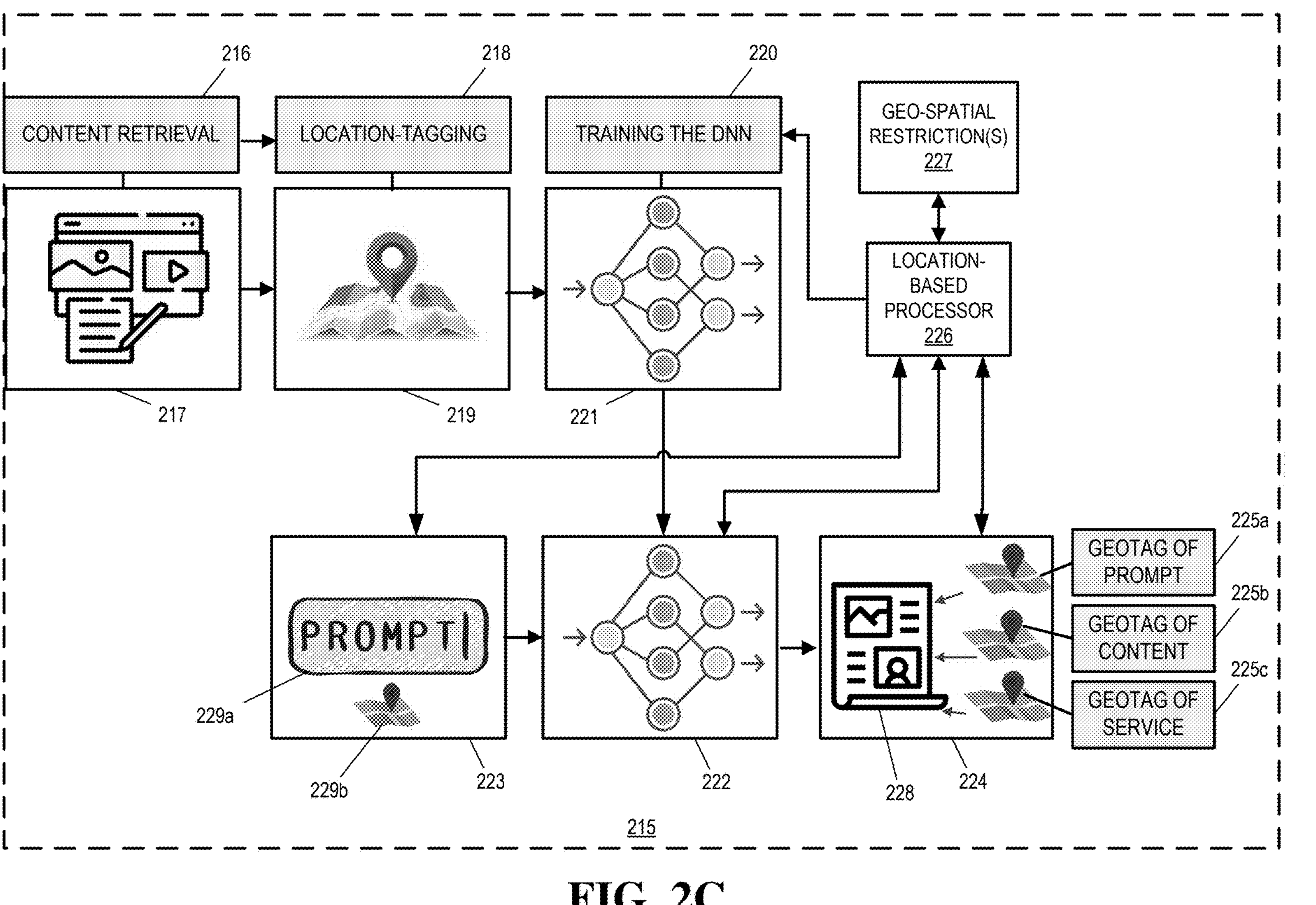
FIG. 2C is a block diagram illustrating another example, non-limiting embodiment of a location-based, generative AI system functioning within the communication network of FIG. 1 in accordance with various aspects described herein.

FIG. 2C is a block diagram illustrating another example, non-limiting embodiment of a location-based, generative AI system 215 functioning within the communication network 100 of FIG. 1 in accordance with various aspects described herein. The location-based, generative AI system 215 includes a content retrieval module 216 configured to retrieve digital content 217 from one or more content sources 175 (FIG. 1), a location tagging module 218 configured to determine location(s) associated with the digital content 217 and to generate location-enriched digital content 219, and an AI training module 220 configured to configure and/or otherwise train a generative AI model 221 to obtain a location-aware, generative AI model 222. The location-based, generative AI system 215 also includes a prompt module 223 configured to obtain a prompt 229*a*, to determine prompt location data 229*b* and to forward an input to the location-aware, generative AI model 222 based on the prompt 229*a*. The location-aware, generative AI model 222 generates an AI generated output 228 that is provided to an output processing module 224.

The location-based, generative AI system 215 further includes a location-based processor 226 configured to identify a requirement and to affect a solution of an AI system according to the requirement as may be based upon location information. In at least some embodiments, the location-based processor 226 is in communication with the prompt module 223. For example, the location-based processor 226 may receive an input from the prompt module 223 in the form of the prompt 229*a* itself and/or some indication related to the prompt as may have been generated by the prompt module 223. In at least some embodiments, the location-based processor 226 can be configured to evaluate the input to determine and/or otherwise identify any applicable requirements that should be addressed. For example, a prompt that requests and/or is otherwise likely to generate content that may be restricted and/or otherwise subject to regulation by the requirement in at least some locations or jurisdictions.

In at least some embodiments, the location-based, generative AI system 215 further includes a geospatial restriction source 227. The geospatial restriction source 227 may include information identifying restrictions and/or regulations along with applicable locations and/or jurisdictions within which such restrictions and/or regulations are enforceable. In some embodiments, the geospatial restriction source 227 includes a local storage repository. Alternatively, or in addition, the geospatial restriction source 227 may be accessible via a network, such as the example communication network 100 (FIG. 1).

In at least some embodiments, the geospatial restriction source 227 may include an AI model adapted to provide solutions to prompts requesting information related to restrictions and/or regulations along with applicable locations and/or jurisdictions within which such restrictions and/or regulations are enforceable. It is conceivable that the generative AI model 221 and/or the location-aware, generative AI model 222 may be suitable candidates for identifying the restriction and/or regulation information. In such instances, the location-based processor 226 may be configured to generate prompts to an AI model, e.g., the generative AI model 221 and/or the location-aware, generative AI model 222 to obtain the restriction and/or regulation information. In at least some embodiments, the location-based processor 226 may employ one or more agents configured to generate prompts and/or to evaluate output or solutions.

In at least some embodiments, the location-based processor 226 is in communication with the AI training module 220. For example, the location-based processor 226, having identified information related to one or more restrictions and/or regulations along with applicable locations and/or jurisdictions, may provide an input indicating at least the locations and/or jurisdictions to the AI training module 220. The AI training module 220, in turn, may adapt training of the generative AI model 221 so as to diminish, obfuscate and/or otherwise remove or excise content associated with the indicated locations and/or jurisdictions. It is understood that in at least some embodiments, the content affected by the input from the location-based processor 226 may be limited to one or more content modalities. For example, if the requirement relates to copyright of a visual work, then the AI training module 220 may adapt training of the generative AI model 221 with respect to images and/or video, without necessarily affecting the content related to other modalities, such as audio and/or text. A determination of which modalities may be determined by the location-based processor 226 and/or the AI training module 220, e.g., based on input data received from the location-based processor 226.

In at least some embodiments, the location-aware, generative AI model 222 is adapted by the aforementioned training process to determine a location-aware, generative AI model 222 suitable for providing an AI generated output 228 that is compliant with any restrictions and/or regulations that may apply to any of the relevant locations and/or jurisdictions. Alternatively, or in addition, the location-based processor 226 may be in communication with the prompt module 223 to adjust the prompt in a manner so as to promote compliance with any application restrictions and/or regulations. The adapted prompt may then be used to obtain an AI generated output 228 using the location-aware, generative AI model 222. In at least some embodiments, the location-based processor 226 may be in communication with the location-aware, generative AI model 222 to adapt the model in a manner so as to promote generation of the AI generated output 228 in compliance with any application restrictions and/or regulations. The adapted location-aware, generative AI model 222 may be used to process the original prompt 229*a* in such a manner so as to promote generation of the AI generated output 228 in compliance with any application restrictions and/or regulations.

Alternatively, or in addition, the location-based processor 226 may be in communication with the output processing module 224 to evaluate and/or otherwise adapt the AI generated output 228 a manner so as to promote compliance with any application restrictions and/or regulations. For example, the AI generated output 228 may be evaluated.

Although such filtering techniques may be beneficial in many instances, they may not entirely solve at least some issues, such as the right to be forgotten, plagiarism, and violation of copyrights or trademarks, and particularly, those issues that may exist in certain locations or jurisdictions, but not necessarily in others.

In at least some embodiments, safety features, sometimes referred to as guardrails and/or in-context learning, can be added to and/or otherwise used with AI models 222, to avoid generating unwanted results and/or to filter them out. This can be accomplished in one or more different stages of an AI learning and/or content-generation system and/or process. For example, the prompt module 223 can be configured to evaluate a prompt 229*a* to identify risky and/or malicious prompts. In at least some embodiments, such risky and/or malicious prompts can be blocked. The prompt module 223 can be configured to provide an indication to a prompting user that the prompt was identified as potentially containing risky and/or malicious information and/or lead to the generation of content containing risky and/or malicious information.

At least some prompts 229 can be modified, e.g., by the prompt module 223 alone or in combination with the location-based processor 226, by adding, and/or injecting into them instructions to avoid certain content. Adding instructions to prompts 229 can also be used for in-context unlearning. However, if despite these precautions the result or AI generated output 228 is determined to be and/or otherwise classified as harmful, the location-based generative AI system 215 may be configured to refrain from presenting it to the user. For example, the output processing module 224 may be configured to identify, modify and/or remove aspects of the AI generated output provided by the location-aware, generative AI model 222, such that the resulting AI generated output 228 is compliant with any applicable requirements, restrictions and/or regulations. As with fine-tuning, guardrails and/or in-context unlearning can be applied based on geotagging and location information. In at least some embodiments, the location-based generative AI system 215 is configured to prevent jailbreak attacks, e.g., by detecting and/or otherwise preventing long interactions that may cause some models, such as large language models, to leak content that may be sensitive or harmful.

Figure 2D:
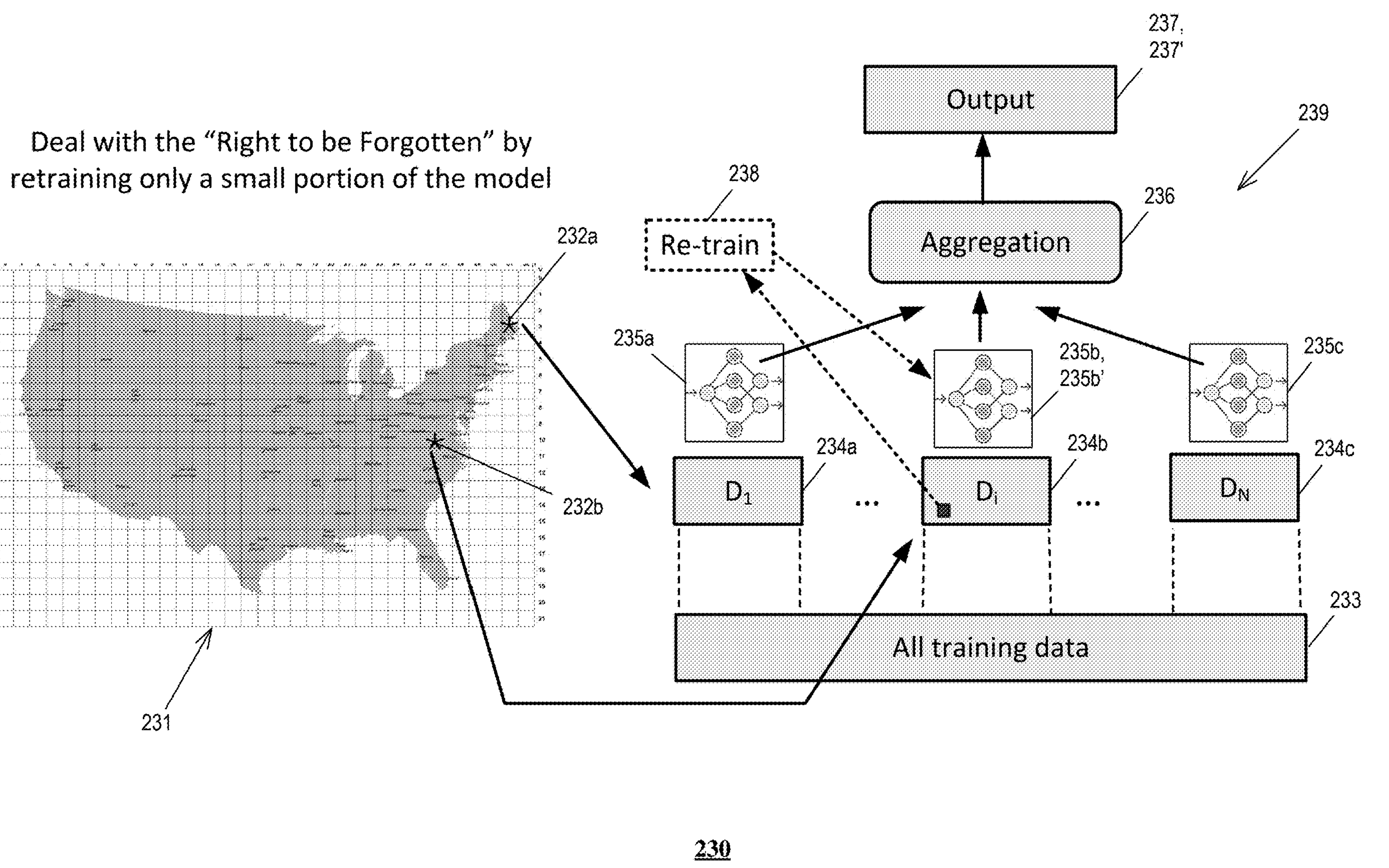
FIG. 2D is a block diagram illustrating an example, non-limiting embodiment of a location-based, generative AI system adapted for re-learning and functioning within the communication network of FIG. 1, and the location-based, generative AI systems of FIGS. 2B and 2C in accordance with various aspects described herein.

FIG. 2D is a block diagram illustrating an example, non-limiting embodiment of a location-based, generative AI system 230 adapted for re-learning and functioning within the communication network 100 of FIG. 1, and the location-based, generative AI systems 200, 215 of FIGS. 2B and 2C in accordance with various aspects described herein. The location-based, generative AI system 230 includes a segmented model 239 including a group of model segments 235*a*, 235*b* . . . 235*c*, generally 235 and at least one aggregation layer 236. The model segments 235 can be trained separately. For example, training data 233 can be segmented into distinguishable segments of training data, e.g., $D_1$ 234*a*, $D_2$ 234*b* . . . $D_N$ 234*c*, generally 234. Accordingly, each model segment 235 may be trained according to a respective segment of the training data 234. The example aggregation layer 236 is in communication with each model segment 235 of the group allowing the model segments 235 to be trained, re-trained and/or otherwise configured separately, such that any combination of more than one model segment 235 occurs in the at least one aggregation layer 236.

By way of example, the model segments may correspond to different regions or locations of a larger, e.g., collective region. The model segments 235 may correspond to regions of a country, e.g., regions of the continental United States. Regions may include the northeast region 232*a*, the southeast region 232*b*, the north-central region, the south-central region, and so on. The aggregation layer 236 combines the separately trained regional model segments 235 to obtain a single output 237 for a larger region, e.g., the continental United States.

In more detail, a first model segment 235*a* can be trained with a first segment of training data $D_1$ 234*a*, which may represent training data associated with a first location or region, e.g., the northeast region 232*a*. Likewise, a second model segment 235*b* can be trained with a second segment of training data $D_2$ 234*b*, which may represent training data associated with a second location or region, e.g., the southeast region 232*b*. Other segments of training data 234 may be associated with other regions of the continental United States 231.

According to the illustrative example, a requirement relates to a "right to be forgotten" as may apply to an individual and/or group of individuals associated with the southeast region 232*b*, e.g., residents within the southeast region 232*b*. Content related to this particular an individual and/or group of individuals may reside within the second segment of training data $D_2$ 234, representing only a small fraction of the training data of that segment. According to a retraining process 238, a location associated with the particular individual or group of individuals may be associated with the second segment of training data $D_2$ 234*b*, e.g., based on an address of their residence, a geolocation of their personal communication device, or the like. In at least some embodiments, the training data of the second segment of training data $D_2$ 234*b*, may be adjusted to remove content associated with the particular individual and/or group of individuals. The second model segment 235*b* may be retrained with revised training data to obtain a revised model segment 235*b*'. The aggregation layer 236 can aggregate outputs from the model segments 235, including the revised model segment 235*b*' to obtain a revised output 237' that excludes information related to the individual and/or group of individuals exercising their right to be forgotten. The re-training effort associated with retraining a subset of the model segments 235 and performing the aggregation is significantly less than would be encountered in retraining the entire model, i.e., without the benefit of segmentation.

The existence of unwanted content in machine-learning models has motivated the study of machine unlearning. The goal of machine unlearning is to remove from the model the effect of the unwanted training data. It is understood that unlearning may be applied according to the retraining 238, e.g., to remove unwanted information from the second model segment 235*b* to obtain a re-trained second model segment 235*b*'. Unwanted information may include data items, features, a class of items, etc. The initial data set is denoted by D and refers to the subset of items that should be forgotten as $D_f \subset D$. Let $M=T(D)$ be the model that is trained over D by a training algorithm T. Let $M^-=U(M, D_f)$ be the result of unlearning the data in $D_f$ using algorithm U. The research community studies different ways to define what should be $M^-$ and the algorithm U. The following approaches were suggested.

In exact unlearning, the model $M'=T(D\backslash D_f)$ is the result of training the model on the data set D after removing the unwanted records in $D_f$, and the requirement is that M' and $M^-=U(M, D_f)$ are indistinguishable, in the sense that both of them are drawn from the same distribution. One approach of partitioning the AI model 239 into N independently trained slices or segments 235 and merging them, e.g., aggregating them, so that a removal of an item will require retraining only a single slice. This method is often referred to as sharded, isolated, sliced, and aggregated (SISA) training. In this method, unlearning an item requires about $1/N^{th}$ of the work needed for retraining the entire model.

SISA training seems highly suitable for a geospatial setting. In a Geo-SISA setting, the records of D can be partitioned based on location, e.g., geographically, jurisdictionally, etc., so that every change is local. This approach eases adaptation to local changes, e.g., a change in a state law that does not apply to other states. FIG. 2D depicts the proposed Geo-SISA architecture.

Figure 2E:
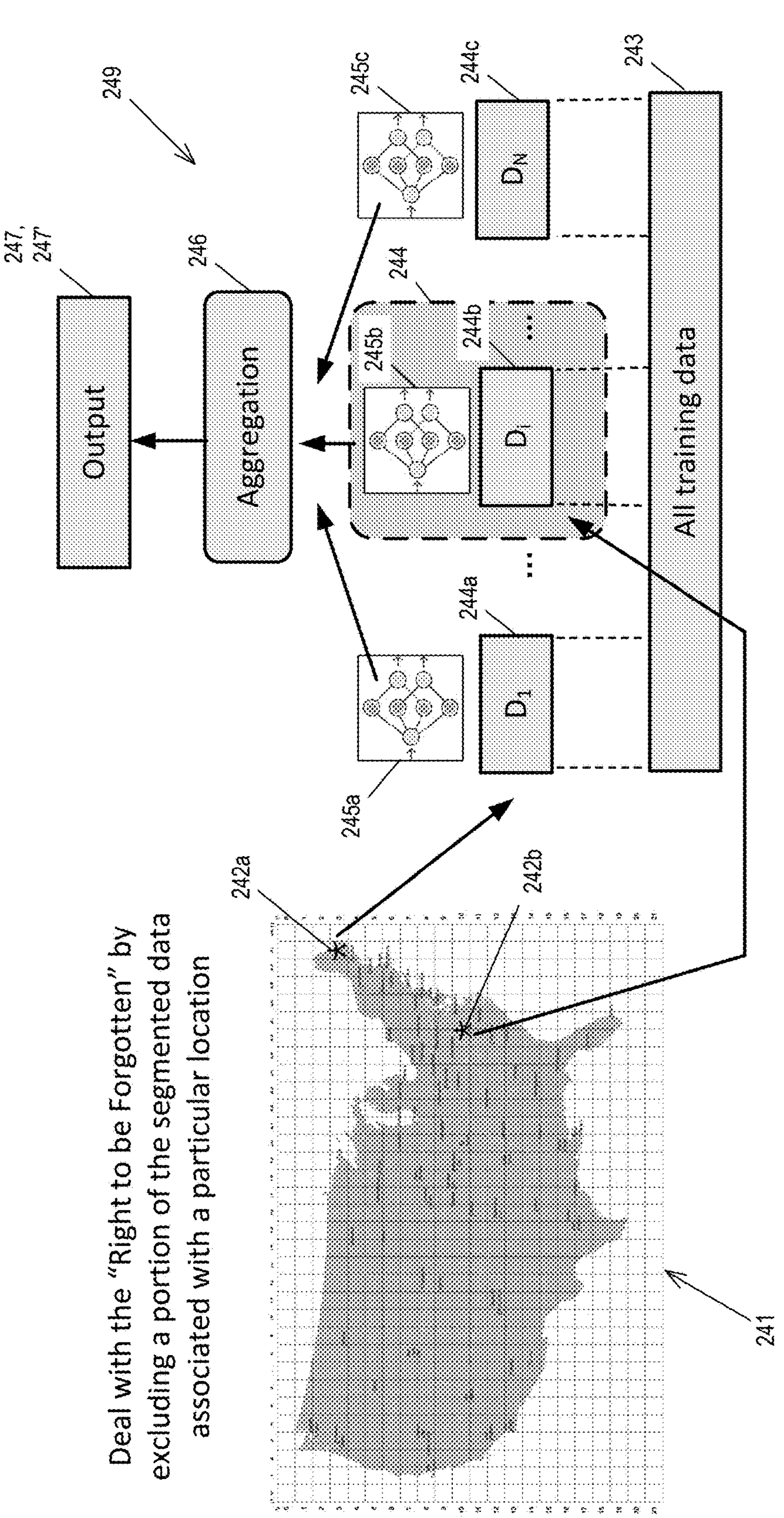
FIG. 2E is a block diagram illustrating another example, non-limiting embodiment of a location-based, generative AI system adapted for re-learning and functioning within the communication network of FIG. 1 and the location-based, generative AI systems of FIGS. 2B and 2C in accordance with various aspects described herein.

FIG. 2E is a block diagram illustrating another example, non-limiting embodiment of a location-based, generative AI system 240 adapted for re-learning and functioning within the communication network 100 of FIG. 1 and the location-based, generative AI systems of FIGS. 2B and 2C in accordance with various aspects described herein. Once again, the location-based, generative AI system 240 includes a segmented model 249 including a group of model segments 245*a*, 245*b* . . . 245*c*, generally 245 and at least one aggregation layer 246. The model segments 245 can be trained separately. For example, training data 243 can be segmented into distinguishable segments of training data, e.g., $D_1$ 244*a*, $D_2$ 244*b* . . . $D_N$ 244*c*, generally 244. Accordingly, each segmented model 245 may be trained according to a respective segment of the training data 244. The example aggregation layer 246 is in communication with each model segment 245 of the group allowing the model segments 245 to be trained, re-trained and/or otherwise configured separately, such that any combination of more than one model segment 245 occurs in the at least one aggregation layer 246.

According to the illustrative example first model segment 245*a* can be trained with a first segment of training data $D_1$ 244*a*, e.g., associated with a northeast region 242*a* of the continental United States. Likewise, a second model segment 245*b* can be trained with a second segment of training data $D_2$ 244*b*, which may represent training data associated with a southeast region 242*b*. Other segments of training data 244 may be associated with other regions of the continental United States 241.

According to the illustrative example, a requirement relates to a "right to be forgotten" as may apply to an individual and/or group of individuals associated with the southeast region 242*b*, e.g., residents within the southeast region 232*b*. It may be appreciated that content related to this particular an individual and/or group of individuals may represent only a small fraction of the training data of the second segment of training data $D_2$ 244. Nevertheless, the associated model segment 235*b* may be excluded, such that the aggregation layer 246 performs an aggregation of the model segments 235, excluding one or more model segments 235 associated with the particular individual and/or group of individuals to obtain an output 247. For example, a location associated with the particular individual or group of individuals may be determined and associated with the second segment of training data $D_2$ 244*b*, e.g., based on an address of their residence, a geolocation of their personal communication device, or the like. In at least some embodiments, the second segment of training data $D_2$ 244*b*, may identified as containing content related to the particular individual and/or group of individuals. The second model segment 245*b* may be identified as having been trained according to the second segment of training data 244*b* and excluded from aggregation. The aggregation layer 246 can aggregate outputs from the model segments 245, excluding the identified model segment 245*b* to obtain a revised output 247' that excludes information related to the individual and/or group of individuals exercising their right to be forgotten.

Another approach is referred to as enforcing differential privacy. The use of differential privacy is not unlearning in the exact sense, but it offers an approach to address the problem of sensitive personal data in models. Enforcing differential privacy prevents leakage of sensitive information from the model. In this approach, noise, e.g., Gaussian or Laplacian noise, is added to the gradients of the model, so that for every two neighboring data sets D and D' that differ in a single element, the statistical difference between the models that are trained on them is as small as desired, according to the magnitude of the added noise.

The parameters □ and □ may be used as privacy parameters, considering training algorithm $T^{dp}$ as satisfying (□, □)-differential privacy when the following holds. For every set S of models, $P(T^{dp}(D)\in S)\leq e^{\square}\cdot P(T^{dp}(D')\in S)+\square$. That is, a probability that the result of the training will vary by more than $e^{\square}$ does not exceed □.

In a differential privacy setting, the privacy budget is the amount of permitted leakage of sensitive information. For large-scale models, the privacy budget could vary according to the location. In some states, rules could be strict, while other states could be more lenient. Differential privacy can be applied to a location-aware AI model. For example, a geospatial partition of the training data, e.g., as illustrated in FIGS. 2D and 2E would allow for applying different policies in different places. Data could be collected using local differential-privacy protocols. As yet another approach the models can be trained in batches according to a geospatial location, such as a geospatial location of the data source. Noise, e.g., Gaussian or Laplacian noise, can be added according to the privacy budget in at least some of the places, e.g., based on the different geospatial locations.

Yet another techniques, referred to as fine-tuning, can be used when an AI model needs to forget or unlearn an entire concept, but set of items to remove may not be well-defined. For example, if the AI model needs to forget any set of instructions on how to create a psychedelic drug from orange juice—a made-up example—how should the user remove the unwanted content without adversely affecting important knowledge about orange juice? In at least some embodiments, a fine tuning of the model can be used to address this concern by training and/or re-training the model to forget the unwanted concepts. Location enriched content, e.g., geotagged content, enables using this approach to forget information associated with a location L by defining L as a class and applying fine-tuning to forget concepts related to L.

Figure 2F:
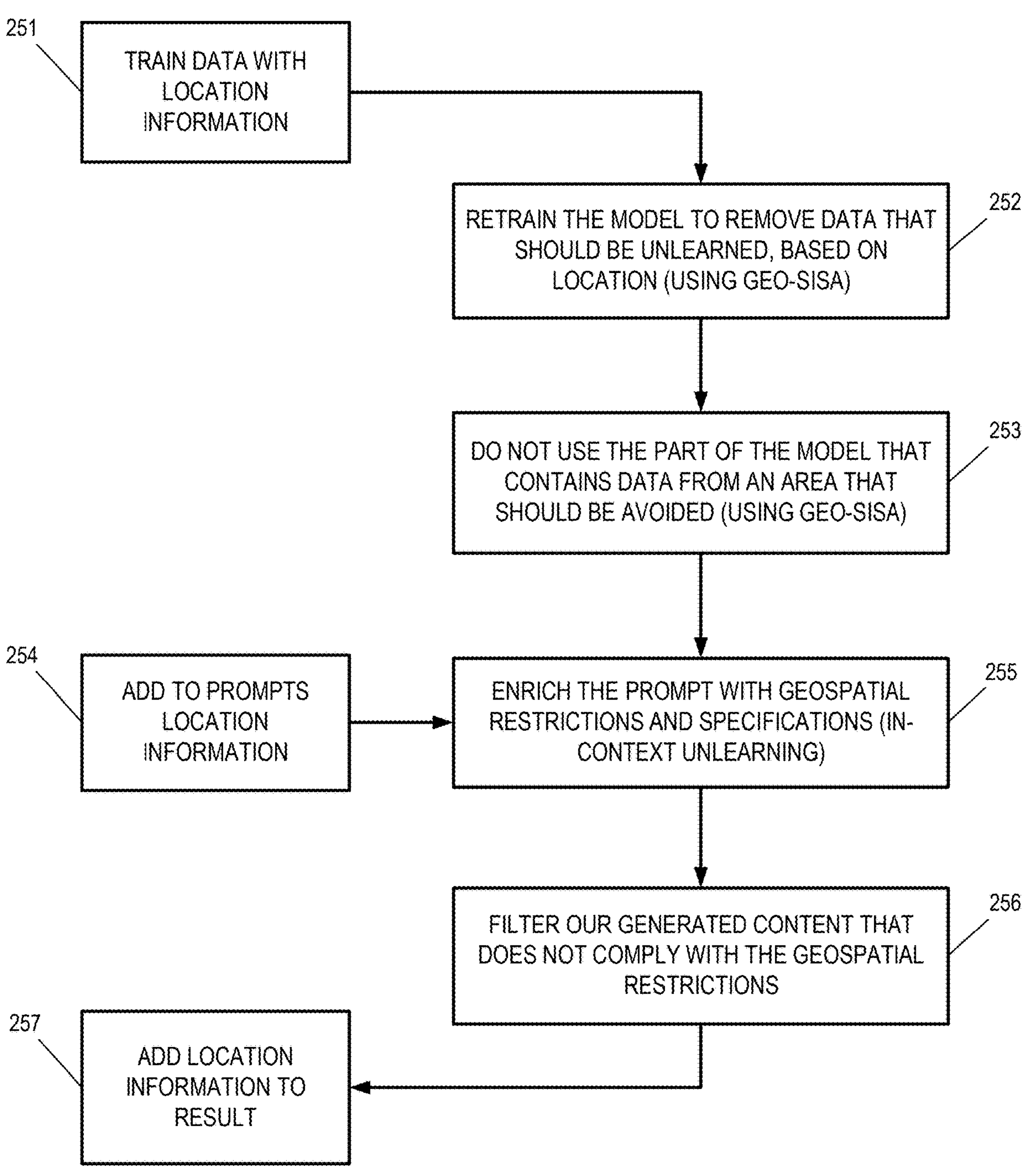
FIG. 2F depicts an illustrative embodiment of a location-based, generative AI process in accordance with various aspects described herein.

FIG. 2F depicts an illustrative embodiment of a location-based, generative AI process 250 in accordance with various aspects described herein. According to the illustrative example, the process trains a machine learning model, e.g., an AI model, to incorporate digital content and corresponding location data at 251. For example, location-enhanced training data may be generated based on digital content and associated location data. The training data may have one or more modalities, such as text, audio, images, video and so on. Location data can be identified according to any one or more of the various techniques disclosed herein. For example, the location data may be determined based on a location associated with the content, such as a location identified and/or otherwise suggested by the content. Alternatively, or in addition, the location may be related to a source of the content. It is envisioned that in at least some embodiments, more than one location may be associated with a particular item of digital content. In at least some embodiments, a reliability and/or priority of the location data may be identified and included with the location data. As discussed herein, the location data may be associated with a digital content item by way of metadata of the digital content item. Alternatively, or in addition, the location data may be incorporated and/or otherwise encoded into the digital content item, e.g., as a digital watermark. The trained AI model may be referred to as a location-aware AI model.

According to the example location-based, generative AI process 250, and in at least some embodiments, a machine learning model, e.g., an AI model may be trained and/or otherwise re-trained according to digital content associated with a particular location. For example, data that should be removed from the AI model, and/or prevented from appearing in generative AI solutions, e.g., unlearned, may be identified according to one or more locations. The location-aware AI model may be retrained to obfuscate, remove and/or otherwise unlearn digital content based on the one or more location at 252. In at least some embodiments, the unlearning may be implemented according to a Geo-SISA process as discussed in relation to FIG. 2D.

Alternatively, or in addition, a portion of the location-aware AI model that contains data from an area that should be avoided can be identified and not relied upon in a generative AI solution. Namely, the location-aware AI model may be reconfigured and/or otherwise adjusted to exclude and/or otherwise avoid using digital content associated with a particular location. For example, data that should be avoided in a generative AI solution, may be identified according to one or more locations. The location-aware AI model may be retrained by avoiding digital content at 253 associated with the one or more location. In at least some embodiments, the data avoidance may be implemented according to a Geo-SISA process as discussed in relation to FIG. 2E.

In at least some embodiments, the location information can be associated with the prompts at 254. For example, a prompt may include an inquiry, a command and/or a request for information directed to an AI system. The prompt may be provided according to one or more modalities, such as text, audio, images, video and so on. In at least some embodiments, location information may be identified as a source location associated with generation and/or initiation of the prompt. For example, the location may be determined according to a location of user equipment, e.g., providing a user interface to accept the prompt. Alternatively, or in addition location information may be identified according to content of the prompt. For example, the prompt may request information related to a location and/or request that a solution be provided for a particular location or jurisdiction.

In at least some embodiments, the prompt may be enriched and/or otherwise enhanced or augmented according to the location information at 255. For example, the information associated with the prompt may be used as a location for which data should be removed from a model, e.g., at 252, and/or for which a model should be retrained, e.g., at 253.

In at least some embodiments, content provided in and/or associated with an output of the AI system may be removed, obfuscated and/or otherwise filtered. For example, content of a solution and/or generated content that does not comply with the geospatial restrictions may be removed, obfuscated and/or otherwise filtered from the output at 256. In at least some embodiments, location information may be identified and added at 257 to a result, e.g., generated AI content. In at least some embodiments, the location data may be associated with one or more of a location of source of the digital content provided in the solution, a location of a source of the prompt, a location of a one or more processors and/or servers utilized in training the location-aware AI model, in retraining the model, in processing the prompt, in processing the location-aware AI model to obtain a solution of the prompt, and so on, including a location at which the solution is provided, distributed and/or otherwise presented. It is understood that any one or more of the various locations may be utilized in any of the location-based process steps disclosed herein.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Applying the example re-configuring techniques, e.g., unlearning, in a location-aware form supports treatment of content, AI processing and generated AI content according to rules that may relate to location, such as the right to be forgotten as may apply to local rules and regulations.

In at least some embodiments, the AI techniques disclosed herein include verification and/or mitigation to ensure that AI generated content does not violate a requirement, regulation or rule, such as copyrights, trademark regulations, or the right to be forgotten, and so on. In particular, the location-based, e.g., geospatial, systems, devices, processes and software disclosed herein facilitate at least partial mitigation of at least some data-ownership problems in which location is an essential attribute by supporting economic incentives, geo-blocking, and location provenance.

In at least some embodiments, the AI techniques disclosed herein may be applied in other capacities, such as compensation of data owners for the use of copyright-protected data, e.g., based on Shapley Royalty Share, a method that uses cooperative game theory to fairly distribute royalties among contributors based on their proportional impact on the creation of AI-generated content. It is understood that such approaches can be combined with evaluation of the value of location-based or geospatial data. At least one goal would be to compensate some, if not all data owners based on an added value of the data, including those who lack means and political power. Since proving data ownership is often hard, the location-based techniques disclosed herein, e.g., geotagging, can be used for compensation based on location, jurisdiction and/or geography, e.g., royalties for content from rainforests may be given to The World Rainforest Fund.

By way of further example, another mitigation technique implements location-based blocking, e.g., geo-blocking, and/or location-aware digital rights management (DRM) in which content usage may be geographically restricted. For example, an AI model can be configured to generate content based on data that do not violate laws and regulations in the place where it is applied. For example, the Geo-SISA architecture, as presented in FIG. 2D, can be adapted to support this by partitioning the training data based on usage restrictions.

Verifiable geospatial provenance of data, models, prompts, and content usage, e.g., based on geotagging as suggested herein, can help to address local data-ownership laws. The advantage of geotagging is that locations are typically easily acquired and can tell which local law applies. It is understood that in at least some embodiments, not all of the data, e.g., digital content, will be associated with location data or geotagged. Thus, location provenance can be integrated with other types of provenance, like data source, e.g., U.S. Census, Web source, e.g., Wikipedia, etc., creating trustworthiness scores based on varied provenance information is an open challenge.

Combining compensation, restricted use based on geo-blocking, location provenance, and trustworthiness scores will provide organizations with new tools for AI governance and can help the community develop better and safer generative AI systems. Further research is required to apply these tools effectively.

Figure 3:
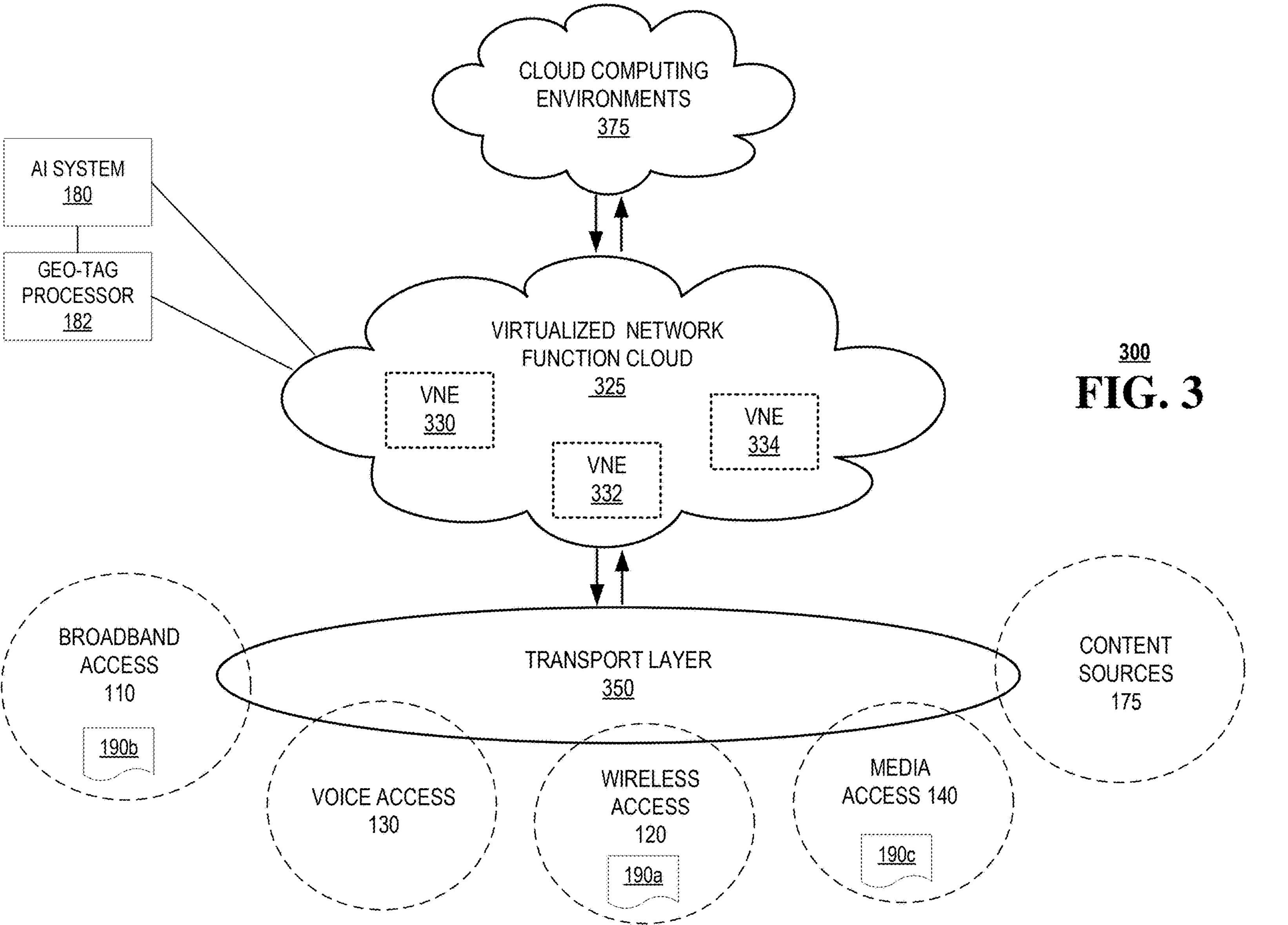
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of the communication network 100, the subsystems and functions of systems 215, 230, 240, 260, and process 250 presented in FIGS. 1, 2B, 2C, 2D, 2E, 2F, 2G and 3. For example, virtualized communication network 300 can facilitate in whole or in part identifying a location associated with digital content, enhancing the digital content according to the location and configuring a generative artificial intelligence (AI) model according to the enhanced digital content to facilitate generative AI solutions according to the location.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. At other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

In at least some embodiments, the virtualized communication network 300 includes and/or otherwise supports operation of an AI system 180. The AI system 180 may be in communication with a geo-tagging processor 182. The geo-tagging processor 182 may be configured to associate location information with operation of the AI system 180. For example, the geo-tagging processor 182 may be configured to identify and/or otherwise associate location data with content used by an AI model of the AI system 180. Location data may include any of the various examples disclosed herein alone or in combinations. The virtualized communication network 300 may include and/or otherwise support operation with one or more follower applications and/or devices, e.g., application programs or apps 190*a*, 190*b*, 190*c*, generally 190. The apps 190 may communicate and/or otherwise interact with one or more of the AI system 180 and/or the geo-tagging processor 182, e.g., via respective access networks 110, 120, 140, and/or via the transport layer and/or via the virtualized network function cloud 325, including one or more of the VNEs 330, 332, 334.

Figure 4:
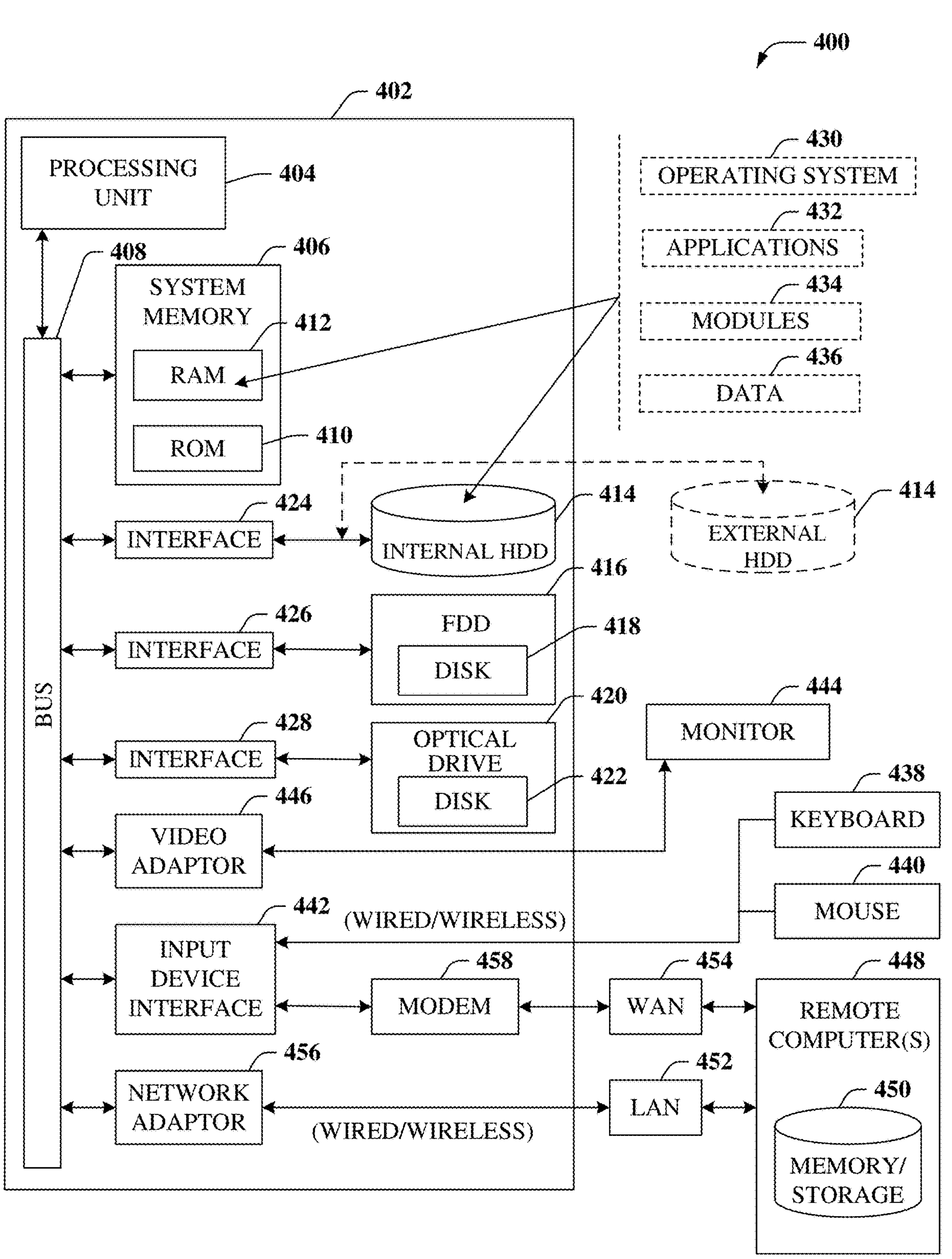
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying a location associated with digital content, enhancing the digital content according to the location and configuring a generative artificial intelligence (AI) model according to the enhanced digital content to facilitate generative AI solutions according to the location.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
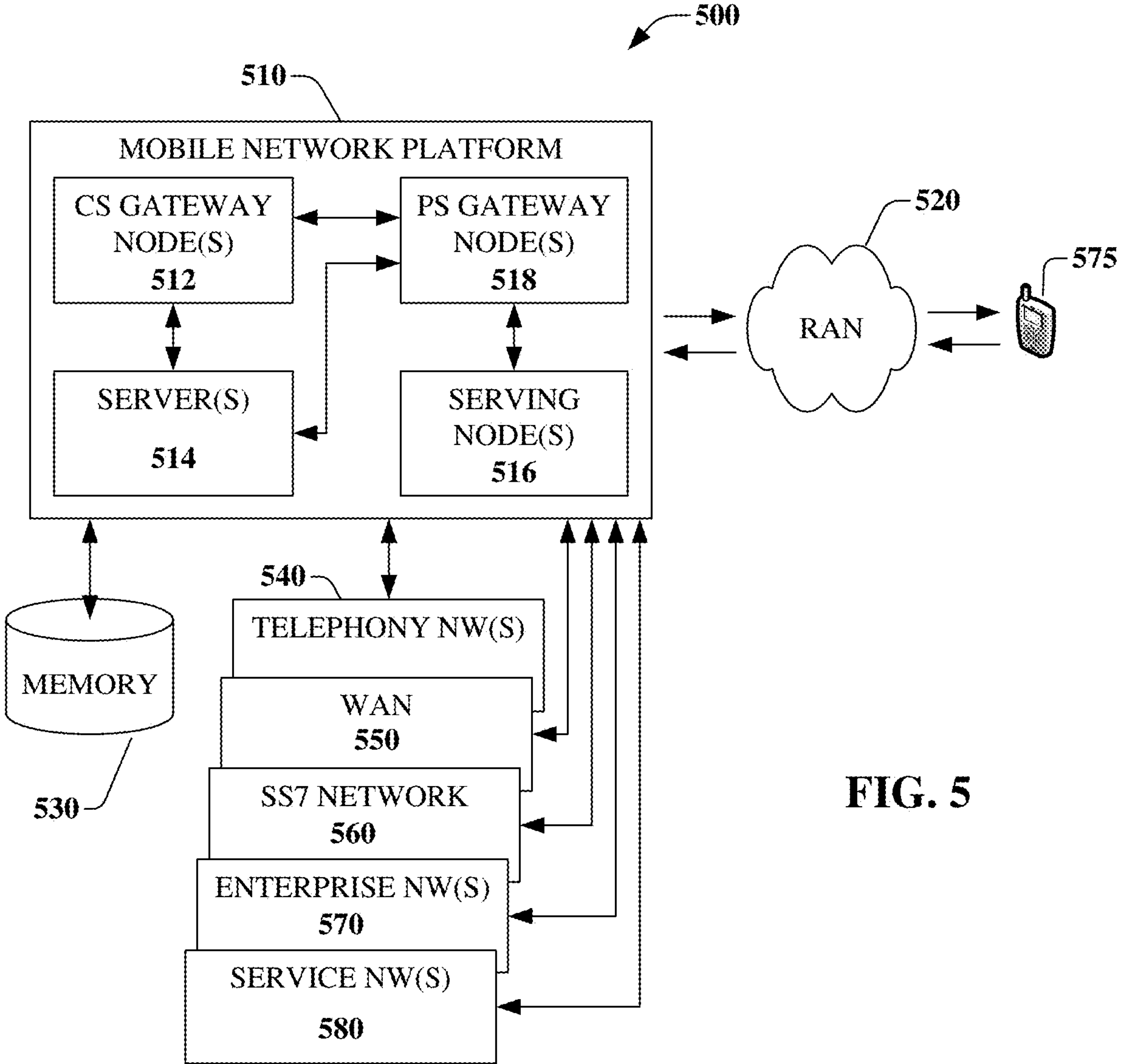
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330,

332, 334, etc. For example, platform 510 can facilitate in whole or in part identifying a location associated with digital content, enhancing the digital content according to the location and configuring a generative artificial intelligence (AI) model according to the enhanced digital content to facilitate generative AI solutions according to the location. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
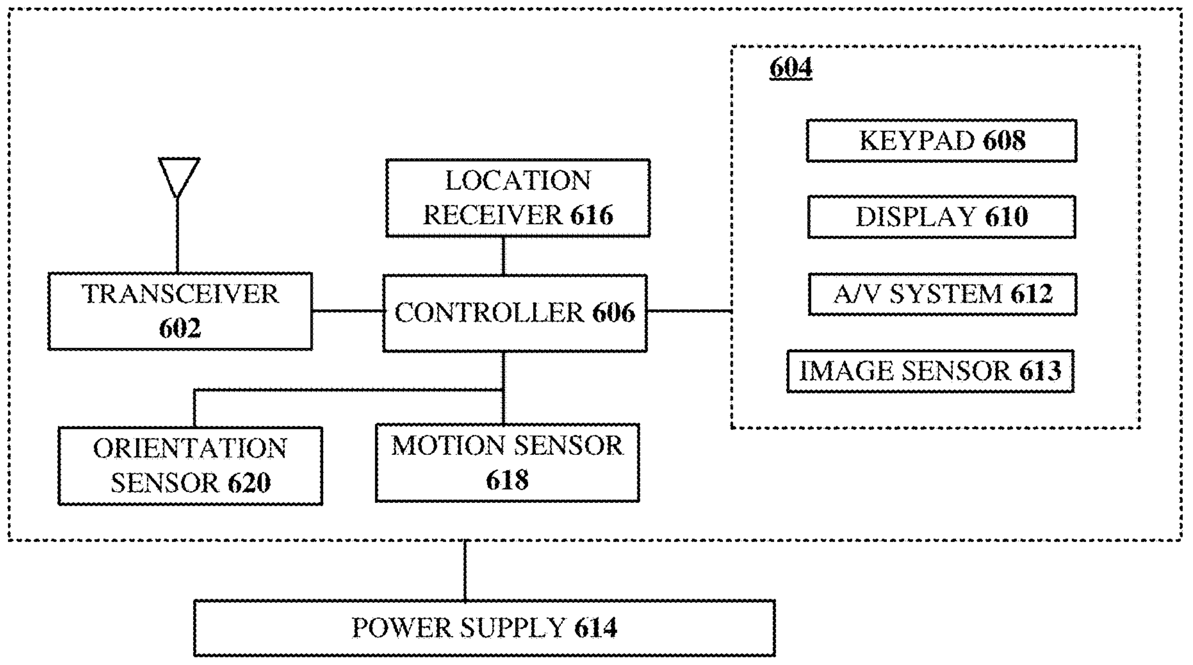
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communication network 125. For example, computing device 600 can facilitate in whole or in part identifying a location associated with digital content, enhancing the digital content according to the location and configuring a generative artificial intelligence (AI) model according to the enhanced digital content to facilitate generative AI solutions according to the location.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as “store,” “storage,” “data store,” data storage,” “database,” and substantially any other information storage component relevant to operation and functionality of a component, refer to “memory components,” or entities embodied in a “memory” or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

Ensuring safe use of data in generative AI applications is a shared goal of both users and AI developers. The community is exploring a variety of new ways for safe use of data and is investing in new tools to support this. However, due to the extensive collection of training data from diverse sources and the complexity of models, enforcing the right to be forgotten, detection and prevention of plagiarism, and protecting copyrights is becoming a challenge. Issues like data ownership, content authenticity, deepfakes, and safeguarding against toxicity and harassment are growing concerns. Additionally, tracking violations of local laws and regulations is becoming increasingly difficult when content creation involves multiple steps being performed in various locations.

To mitigate these risks, the devices, systems, processes and software disclosed herein leverage location information to facilitate removal of data through an unlearning process and/or to track the origin of data and of generated content using geotags and location provenance. The motivation for the disclosed techniques is to help users verify the safety of applications and models by limiting data and usage to trustworthy origins and safe places. Due to the rapid adoption of AI in nearly every aspect of modern life, ensuring the safety of AI applications is critical for the future.

Although the illustrative embodiments and examples disclosed herein refer to the identification of location, the enriching of digital content with location, the training and/or operation of AI models and/or AI systems according to location and the like, it is understood that other information may be used in a similar manner, either alone or in combination with the location information. Examples of other information, referred to generally as enriching and/or enhancing information, include, without limitation, time, ownership, digital content source, copyright, trademark, and/or individual identity. It is understood that such enriching information may be applied alone or in any combination to any of the example techniques, devices, systems, processes and computer readable media disclosed herein.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications that can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:

a processing system including a processor; and a memory that stores executable instructions that, when executed by the processing system, facilitate performance of operations, the operations comprising:

identifying digital content;

determining source location data associated with the digital content;

enriching the digital content according to the source location data to obtain location-enriched digital content;

configuring a generative artificial intelligence (AI) model according to the location-enriched digital content to obtain a location-aware, generative AI model configured to generate a solution according to the location-enriched digital content;

receiving a prompt configured to solicit a generative AI solution from the location-aware, generative AI model;

identifying a solution location according to the prompt;

determining a location-based rule according to the solution location; and adapting the generative AI solution according to the location-based rule.

2. The system of claim 1, wherein the determining the source location data further comprises:

analyzing the digital content to obtain an analysis result; and identifying a location according to the analysis result to obtain an identified source location; and generating the source location data based on the identified source location.

3. The system of claim 2, wherein the analyzing the digital content further comprises:

identifying an explicit aspect of the digital content as an explicit location indicator, wherein the identified source location is according to the explicit location indicator.

4. The system of claim 2, wherein the analyzing the digital content further comprises:

identifying an implicit aspect of the digital content as an implicit location indicator, wherein the identified source location is according to the implicit location indicator.

5. The system of claim 1, wherein the enriching the digital content further comprises:

generating metadata based upon the source location data; and associating the metadata with the digital content.

6. The system of claim 1, wherein the source location data comprises a plurality of locations, and wherein the enriching the digital content further comprises:

modifying the digital content based upon the source location data.

7. The system of claim 6, wherein the modifying the digital content further comprises:

generating a digital watermark based upon the source location data; and configuring the digital content according to the digital watermark.

8. The system of claim 1, wherein the identifying the solution location further comprises identifying a geolocation of the prompt.

9. The system of claim 1, further comprising:

identifying ancillary information comprising at least one of a time, an owner, a source, a copyright, a trademark, an identity of an individual, or a privacy right, to obtain related data, wherein the enriching the digital content further comprising enriching the digital content according to the related data to obtain the location-enriched digital content.

10. The system of claim 1, wherein the adapting further comprises:

identifying a subset of the location-enriched digital content based on the solution location; and re-configuring the generative AI model according to the subset of the location-enriched digital content to obtain a reconfigured generative AI model, wherein the generative AI solution is based on the reconfigured generative AI model.

11. The system of claim 10, wherein the re-configuring further comprises unlearning the subset of the location-enriched digital content.

12. A method, comprising:

identifying, by a processing system including a processor, location data associated with digital content;

modifying, by the processing system, the digital content according to the location data to obtain modified digital content;

configuring, by the processing system, a generative artificial intelligence (AI) model according to the modified digital content to obtain a location-aware, generative AI model configured to generate a solution according to the modified digital content;

receiving, by the processing system, a prompt configured to solicit a generative AI solution from the location-aware, generative AI model;

identifying, by the processing system, a solution location according to the prompt;

determining, by the processing system, a location-based rule according to the solution location; and adapting, by the processing system, the generative AI solution according to the location-based rule.

13. The method of claim 12, wherein the location-based rule comprises a jurisdictional rule according to a legal requirement.

14. The method of claim 12, wherein the adapting the generative AI solution further comprises:

identifying, by the processing system, a subset of the modified digital content based on the solution location; and re-configuring, by the processing system, the generative AI model according to the subset of the modified digital content to obtain a reconfigured generative AI model, wherein the generative AI solution is based on the reconfigured generative AI model.

15. The method of claim 12, further comprising:

generating, by the processing system, metadata based upon the location data; and associating, by the processing system, the metadata with the digital content to obtain the modified digital content.

16. The method of claim 12, wherein the identifying the location data associated with the digital content comprises:

identifying an explicit aspect of the digital content as an explicit location indicator or an implicit aspect of the digital content as an implicit location indicator, wherein the location data is identified according to the explicit location indicator or the implicit location indicator.

17. The method of claim 14, wherein the re-configuring further comprises unlearning the subset of the modified digital content.

18. A non-transitory, machine-readable medium, comprising executable instructions that, when executed by a processing system including a processor, facilitate performance of operations, the operations comprising:

identifying a location associated with digital content;

augmenting the digital content according to the location to obtain augmented digital content;

configuring a generative artificial intelligence (AI) model according to the augmented digital content to obtain a location-aware, generative AI model configured to generate a solution according to the augmented digital content;

receiving a prompt configured to solicit a generative AI solution from the location-aware, generative AI model;

identifying a solution location according to the prompt;

determining a location-based rule according to the solution location; and adapting the generative AI solution according to the location-based rule.

19. The non-transitory, machine-readable medium of claim 18, wherein the adapting further comprises:

identifying, by the processing system, a subset of the augmented digital content based on the solution location; and re-configuring, by the processing system, the generative AI model according to the subset of the augmented digital content to obtain a reconfigured generative AI model, wherein the generative AI solution is based on the reconfigured generative AI model.

20. The non-transitory, machine-readable medium of claim 19, wherein the re-configuring further comprises unlearning the subset of the augmented digital content.

* * * * *